United States Patent [19]
Hukuda et al.

[11] Patent Number: 5,624,104
[45] Date of Patent: Apr. 29, 1997

[54] VIBRATION ISOLATING SUPPORTER

[75] Inventors: Koumei Hukuda, Tokyo; Kenji Takuma, Kisarazu; Minori Kuriyama, Kisarazu; Yoshimitsu Murahashi, Kisarazu; Hiroaki Kawakami, Kisarazu; Yuji Iida, Himeji; Kazuki Inaba, Futtsu; Hiroyuki Tanaka, Tachikawa; Katsumi Shimizu, Hiratsuka, all of Japan

[73] Assignees: Nippon Steel Corporation; Showa Electric Wire and Cable Co., Ltd., both of Japan

[21] Appl. No.: 584,939

[22] Filed: Jan. 16, 1996

Related U.S. Application Data

[63] Continuation of Ser. No. 343,417, Nov. 23, 1994.
[51] Int. Cl.⁶ ............................................. B60G 11/56
[52] U.S. Cl. ........................ 267/34; 267/221; 267/136; 267/178
[58] Field of Search ....................... 267/34, 195, 217, 267/221, 248, 249, 286, 289, 291, 136, 140.11, 140.13, 174, 178; 52/167.1, 167.2, 167.4, 167.6

[56] References Cited

FOREIGN PATENT DOCUMENTS

| 53-85489 | 7/1978 | Japan . | |
|---|---|---|---|
| 64-45041 | 3/1989 | Japan . | |
| 1754976 | 8/1992 | U.S.S.R. | 267/34 |

*Primary Examiner*—Robert J. Oberleitner
*Assistant Examiner*—Peter M. Poon
*Attorney, Agent, or Firm*—Joseph C. Mason, Jr.

[57] ABSTRACT

It is an object to effectively and rapidly damp vibration of a vibrating object. A vibration isolating supporter includes a coil spring (3) interposed between an upper frame (1) and a lower frame (2) which are opposed to one another in a vertical direction, and is characterized in that a partition panel (4) is provided for the lower frame (2) to surround a periphery of the coil spring (3), a damping material (5) is accommodated in a portion surrounded by the partition panel (4), and a resisting member is disposed to be suspended in a hollow hole of the coil spring (3) of the upper frame (1) so as to be immersed in the damping material (5).

2 Claims, 25 Drawing Sheets

5,624,104

VIBRATION ISOLATING SUPPORTER

This is a continuation of application Ser. No. 08/343,417 filed on Nov. 23, 1994 pending.

TECHNICAL FIELD

This invention relates to a vibration isolating supporter to isolate vibration input into a structure such as building, road beam and railway beam, an operator's cab, a marine structure or the like. Alternatively, the present invention relates to a vibration isolating supporter to make it hard to externally transfer vibration from, for example, a motor, a manufacturing equipment, a machine for heavy engineering industry or an engine. Alternatively, the present invention relates to a vibration isolating supporter for removing vibration to reduce vibration input from a foundation, a frame or the like. More particularly, the present invention relates to a vibration isolating supporter which can concurrently isolate vibration in both vertical and horizontal directions, and isolate vibration in a rotation direction.

The present invention relates to a vibration isolating supporter applied to the following arts:

(1) Art used to improve a working environment with respect to vibration generated at a factory or the like, and used to concurrently isolate vibration in both the vertical and horizontal directions;

(2) Art used for a vibration isolating apparatus to make it hard to externally transfer vibration from a rotating machine, and used to concurrently isolate vibration in both the vertical and horizontal directions; and (3) Art used for a vibration removing apparatus to reduce vibration input from the foundation or the like, and used to concurrently isolate vibration in both the vertical and horizontal directions.

BACKGROUND ART

In recent years, improvement of a working environment for an operator has been strongly desired in view of both health and efficiency. For example, a large scale crane or the like installed in a factory generates large vibration to vibrate a floor surface of a building in the vicinity thereof, resulting in a harmful effect on the working environment for the operator. Further, equipments in a production factory have been progressively computerized, and the working environment has changed to an intelligent working area into which, for example, many precision apparatuses are introduced. Therefore, improvement for working has been increasingly important.

As a method of carrying out the improvement for working, it can be considered that a floor member of the building may be supported by a laminated rubber in which a plurality of steel plates and rubber plates are laminated. However, the laminated rubber is soft in a horizontal direction, but is hard in a vertical direction. Thus, only small effect can be expected in reduction of the vibration in the factory due to the crane or the like.

Further, though it can be considered that the floor member of the building may be supported by a coil spring which can withstand relatively large load, the following problems are caused.

In order to provide the coil spring withstanding the large load, it is sufficient to simply provide a thick and large spring material. However, in the manufacture of the large-scale coil spring, a larger equipment and more complicated procedure are required than those required for a small coil spring, resulting in problems of considerably increased cost, a more increased height and so forth. In addition, since the coil spring itself has a small vibration damping effect, the generating vibration can not be easily stopped. Hence, a shock absorber is also mounted. However, complicated mounting operation is necessary to rigidly secure the shock absorber to both a base and a supported body. Alternatively, there is another method of immersing the coil spring in damping liquid to promote a damping effect (see, for example, Japanese Utility Model Laid-open No. 3-32229). However, it is impossible to efficiently damp by simply immersing the coil spring in the damping liquid.

A description will now be given of a steel damper, and a viscous damper serving as a typical shock absorber. Though the steel damper is relatively inexpensive, the steel damper can not damp in small deformation (in yield deformation or earlier deformation), and can provide only small vibration isolating effect with respect to small or middle scale vibration. The viscous damper can provide some vibration isolating effect with respect to the small or middle scale vibration. However, the viscous damper requires maintenance due to a lifetime of viscosity, and is expensive.

Alternatively, a composite body including a gelled material and the coil spring is disclosed in, for example, Japanese Patent Laid-open No. 1-182644. The composite body can serve as the composite body including the gelled material and the coil spring in a vertical direction, but can not serve with respect to vibration in horizontal and rotary directions. Consequently, there is a drawback in that the vibration isolating effect can not be expected.

In view of the facts set forth above, it is an object of the present invention to provide a vibration isolating supporter which can withstand the large load, and can efficiently perform a vibration isolating action.

DISCLOSURE OF THE INVENTION

In a first embodiment, the novel apparatus for isolating vibrations includes an upper frame, a lower frame disposed in parallel, vertically spaced relation to said upper frame, a coil spring disposed between said upper frame and said lower frame, said coil spring being in repose when said apparatus is not subjected to vibrations, a plurality of imperforate, upstanding partition panels disposed in surrounding relation to said coil spring, said panels and said lower frame collectively forming an open-topped cavity, each partition panel of said plurality of partition panels having a lowermost end secured to said lower frame and having an uppermost end spaced downwardly from said upper frame, a damping material disposed in said open-topped cavity, said damping material partially immersing said coil spring, a resisting member depending from said upper frame, said resisting member having a diameter less than a diameter of said coil spring and being ensleeved by said coil spring, said resisting member having an axis of symmetry coincident with an axis of symmetry of said coil spring so that said resisting member is disposed concentrically relative to said coil spring, said resisting member having a length less than a length of said coil spring so that a lowermost end of said resisting member is disposed in spaced relation to said lower frame, and said resisting member having a cylindrical configurartion and an imperforate bottom wall so that said resisting member resists displacement through said damping fluid when an external vibration is imparted to said upper plate.

The first embodiment further includes a pair of brackets, there being a bracket secured to opposite ends of said upper frame, a pair of upstanding bolts, there being an upstanding bolt disposed on opposite ends of said lower frame and each upstanding bolt having a lowermost end secured to said lower frame, a pair of bolt-receiving openings formed in said brackets, each of said bolt-receiving openings having a diameter greater than an outer diameter of said upstanding bolts so that said upstanding bolts are loosely received through said openings so that said upper frame may be displaced with respect to said lower frame when a vibration is imparted to said apparatus.

In the first embodiment, there is provided a vibration isolating supporter including a coil spring 3 interposed between an upper frame 1 and a lower frame 2 which are opposed to one another in a vertical direction. The vibration isolating supporter is characterized in that a partition panel 4 is provided for the lower frame 2 to surround a periphery of the coil spring 3, a damping material 5, is accommodated in a portion surrounded by the partition panel 4, and a resisting member 6 is disposed to be suspended in a hollow hole of the coil spring 3 of the upper frame 1 so as to be immersed in the damping material 5.

In the second embodiment, in a vibration isolating supporter a plurality of coil springs 3 are separated and disposed in a transverse direction, peripheries of coil springs 3 are partitioned by partition panels 4, and the damping material 5 is accommodated in an independent space partitioned by the respective partition panels 4.

In the third embodiment, there is provided a vibration isolating supporter including a plurality of coil springs 3 interposed between an upper frame 1 and a lower frame 2 which are opposed to one another in a vertical direction, partition panels 4 provided for the lower frame 2 to respectively surround-peripheries of the plurality of coil springs 3, a damping material 5 accommodated in the respective partition panels 4, and a resisting member 6 having a fin structure fixed to the upper frame 1 to be suspended in hollow holes of the plurality of coil springs 3 so as to be immersed in the damping material 5. In the vibration isolating supporter, the resisting member having the fin structure is expansibly provided so as to increase and decrease an immersing area with respect to the damping material 5.

In the fourth embodiment, there is provided a vibration isolating supporter including a plurality of coil springs 3 opposed to one another in a vertical direction, a damping material 5 accommodated in partition panels 4 provided for the lower frame 2, and resisting members 6 fixed to the upper frame 1 and respectively inserted into hollow holes of the plurality of coil springs 3 to be immersed in the damping material 5. In the vibration isolating supporter, the respective partition panels 4 are movably provided so as to increase and decrease a constrictive width in a horizontal direction with respect to the damping material 5.

There is provided a vibration isolating supporter in which a container 9 having an opening upper portion and a circular cross-section is fixed to a rigidly supporting member 27, a lower end of a metallic coil spring 3 concentrically disposed in the container 9 is fixed on a bottom plate 42 of the container 9, an upper end of the metallic coil spring 3 is fixed to a lower portion of an upper frame 1, an upper portion of a resisting member 6 concentrically disposed in the metallic coil spring 3 is fixed to a lower portion of the upper frame 1 for supporting a vibration body 36, a damping material 5 is accommodated in the container 9, an arc-shaped portion 47 is provided between a lower portion of a peripheral wall plate 46 and a periphery of the bottom plate 42 in the container 9, and an arc-shaped portion 48 is also provided around a lower end of the resisting member 6 so as to respectively provide constant intervals between the arc-shaped portion 47 and arc-shaped portion 48 of the resisting member 6, and between a plane portion of the bottom plate 42 and a lower plane portion of the resisting member 6 in the container 9.

There is provided a vibration isolating supporter in which an upper container 10 having an opening upper portion is disposed above a lower container 11 having an opening upper portion, and an upper end of a lower resisting member 37 is fixed at an intermediate lower portion of a bottom plate 42 in the upper container 10. Further, a lower coil spring 38 surrounds the lower resisting member 37 in the lower container 11 and is made of metal or the like, and both upper and lower ends of the lower coil spring 38 are fixed to the bottom plate 42 of the upper container 10 and a bottom plate 42 of the lower container 11. An upper end of an upper resisting member 39 is fixed at an intermediate lower portion of an upper frame 1 disposed above the upper container 10. An upper coil spring 40 surrounds the upper resisting member 39 in the upper container 10 and is made of metal or the like, and both upper and lower ends of the upper coil spring 40 are fixed to the upper frame 1 and the bottom plate 42 of the upper container 10. A damping material 5 is accommodated in the lower container 11 and the upper container 10, and the bottom plate 42 of the lower container 11 is fixed to a rigidly supporting member 27. An upper portion of a cylindrical body 12 surrounding the upper container 10 and a part of the lower container 11 is fixed to the upper frame 1. Further, a plurality of anchor bolts 25 fixed to the bottom plate 42 of the lower container 11 pass through an annular washer plate 13 fixed at a lower portion of the cylindrical body 12, and spring compressing nuts 15 are fixed to the respective anchor bolts 25 with screwing.

In the fifth embodiment, there is provided a vibration isolating supporter in which a cylindrical body 12 surrounding an upper container 10 and a part of a lower container 11 is fixed to an upper frame 1, a lower bolt 14 passes through an annular washer plate 13 fixed to an outside lower portion of the cylindrical body 12, and a spring compressing nut 15 is fixed to the lower bolt 14 with screwing.

BEST MODE FOR EMBODYING THE INVENTION

Figure 1:
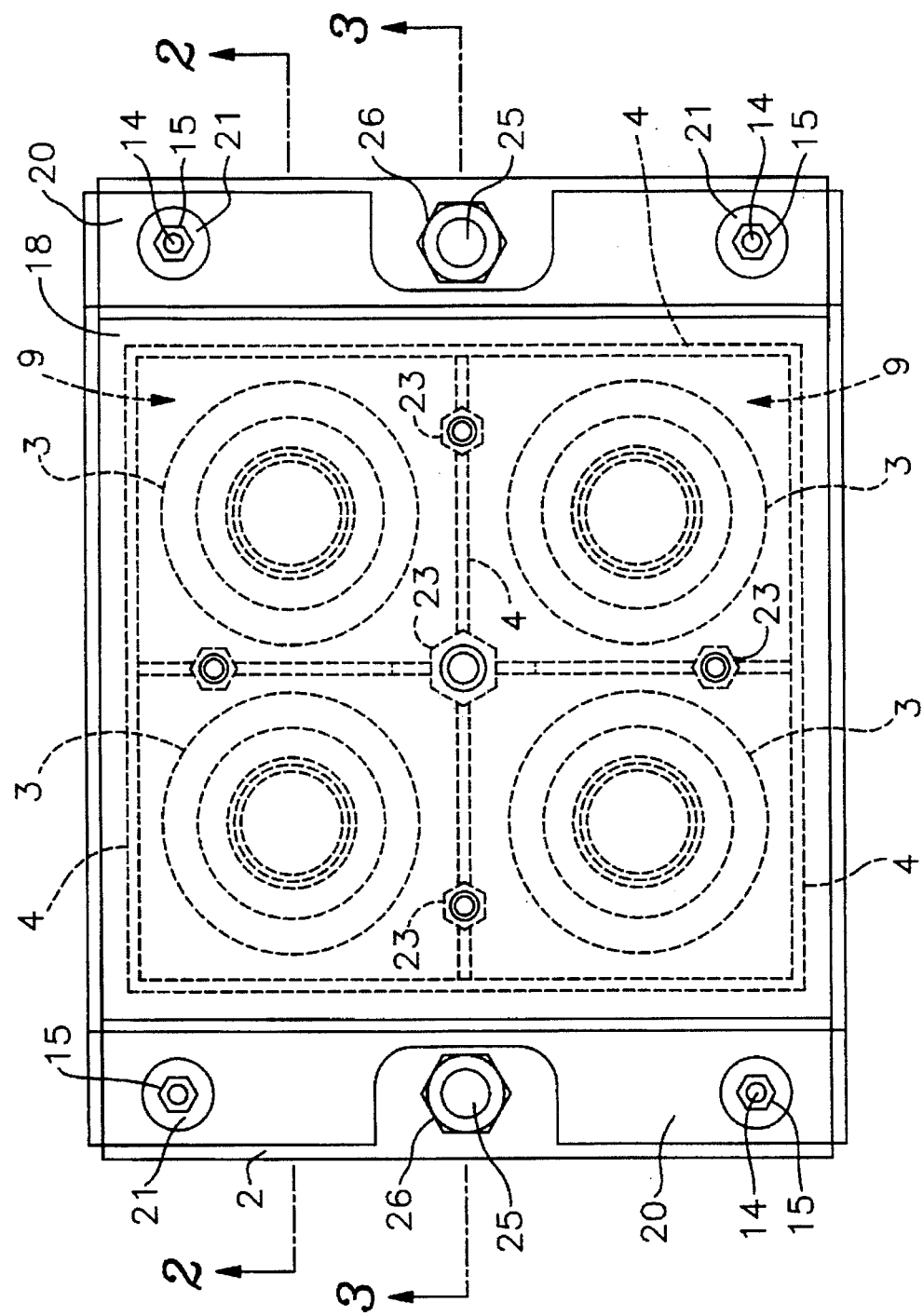
FIG. 1 is a plan view showing an embodiment of a vibration isolating supporter of the present invention.
Figure 2:
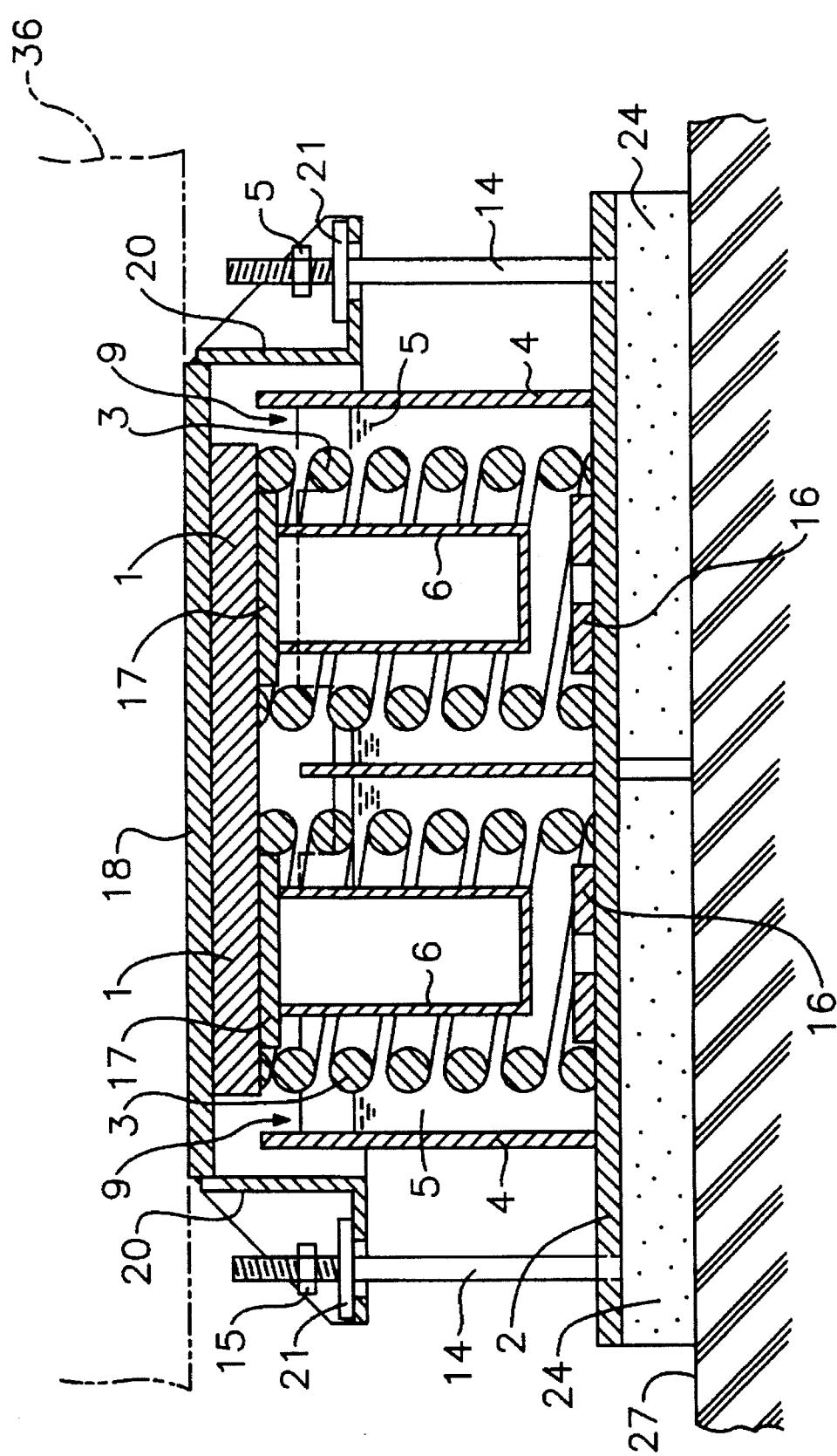
FIG. 2 is a sectional view taken along line 2—2 of FIG. 1.
Figure 3:
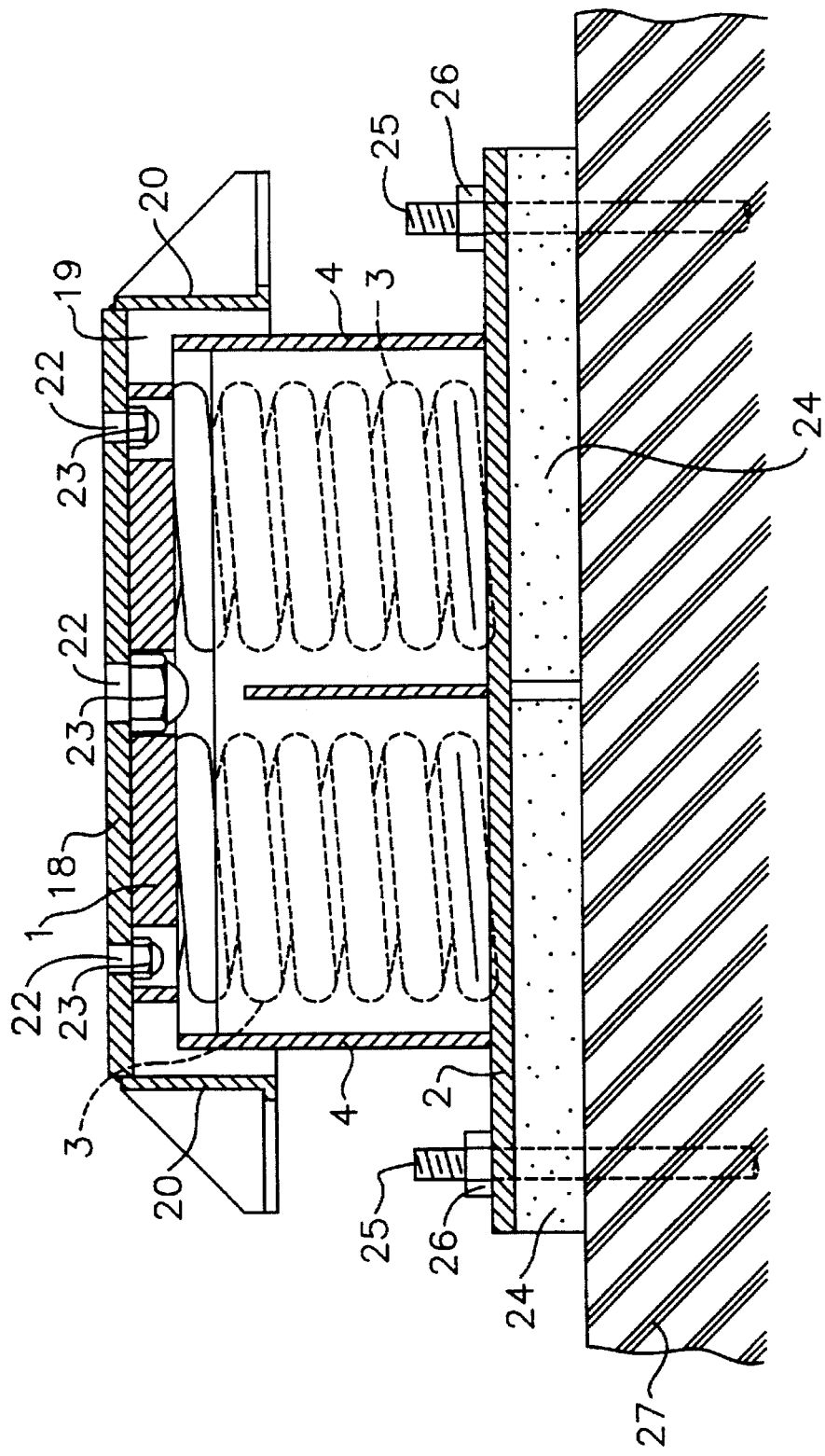
FIG. 3 is a sectional view taken along line 3—3 of FIG. 1.
Figure 4:
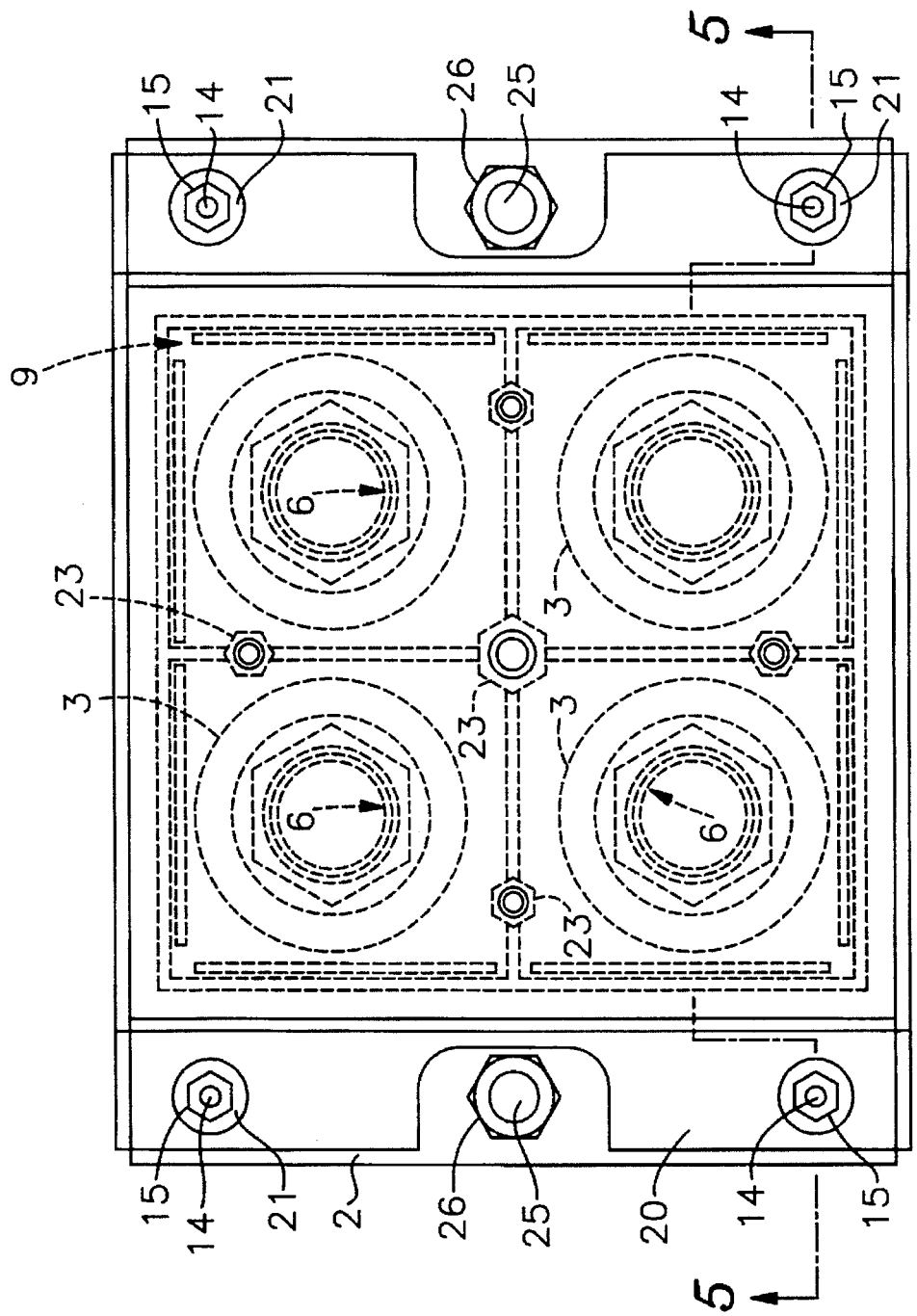
FIG. 4 is a plan view showing another embodiment of the vibration isolating supporter of the present invention.
Figure 5:
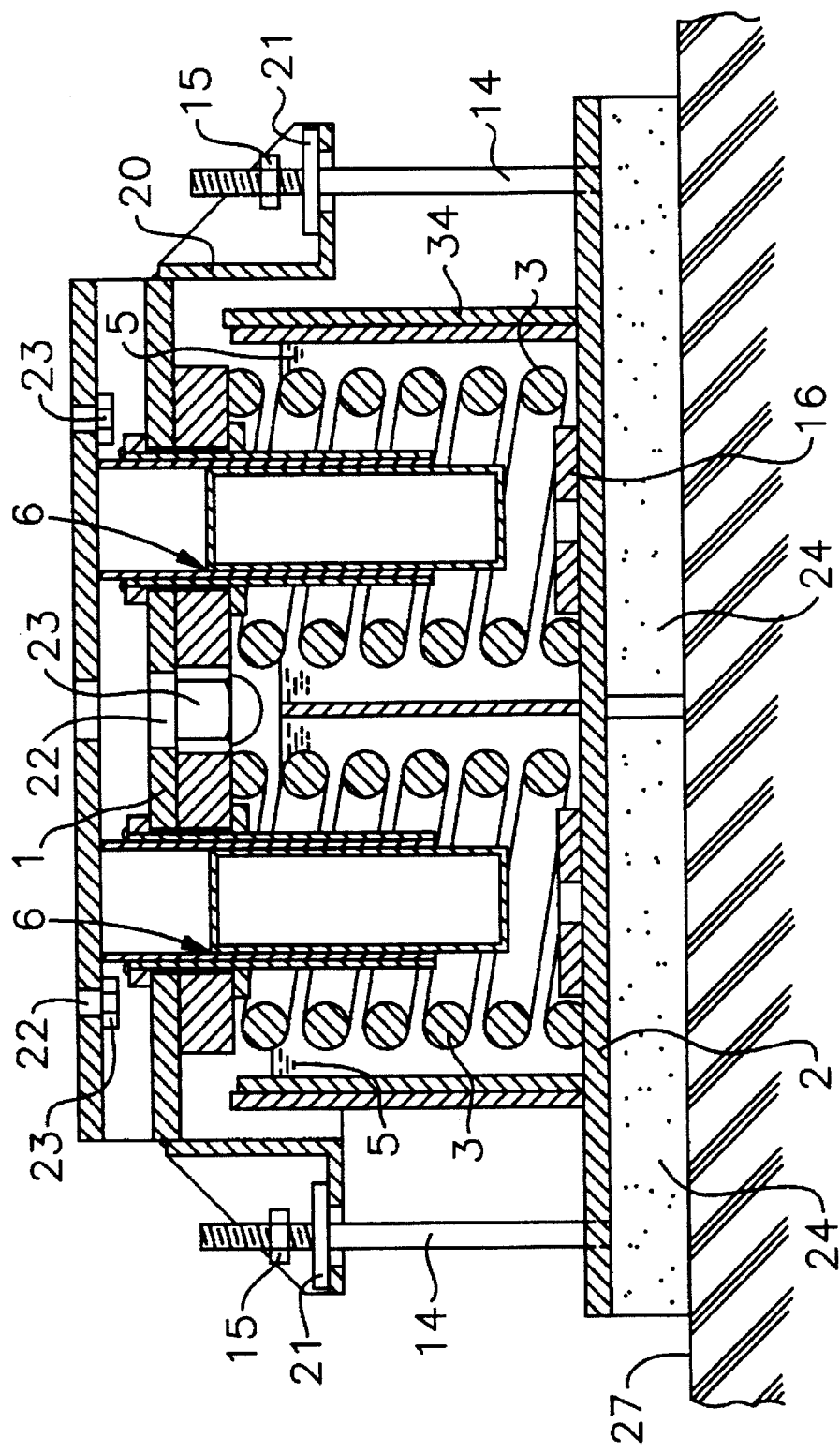
FIG. 5 is a sectional view taken along line 5—5 of FIG. 4.
Figure 6:
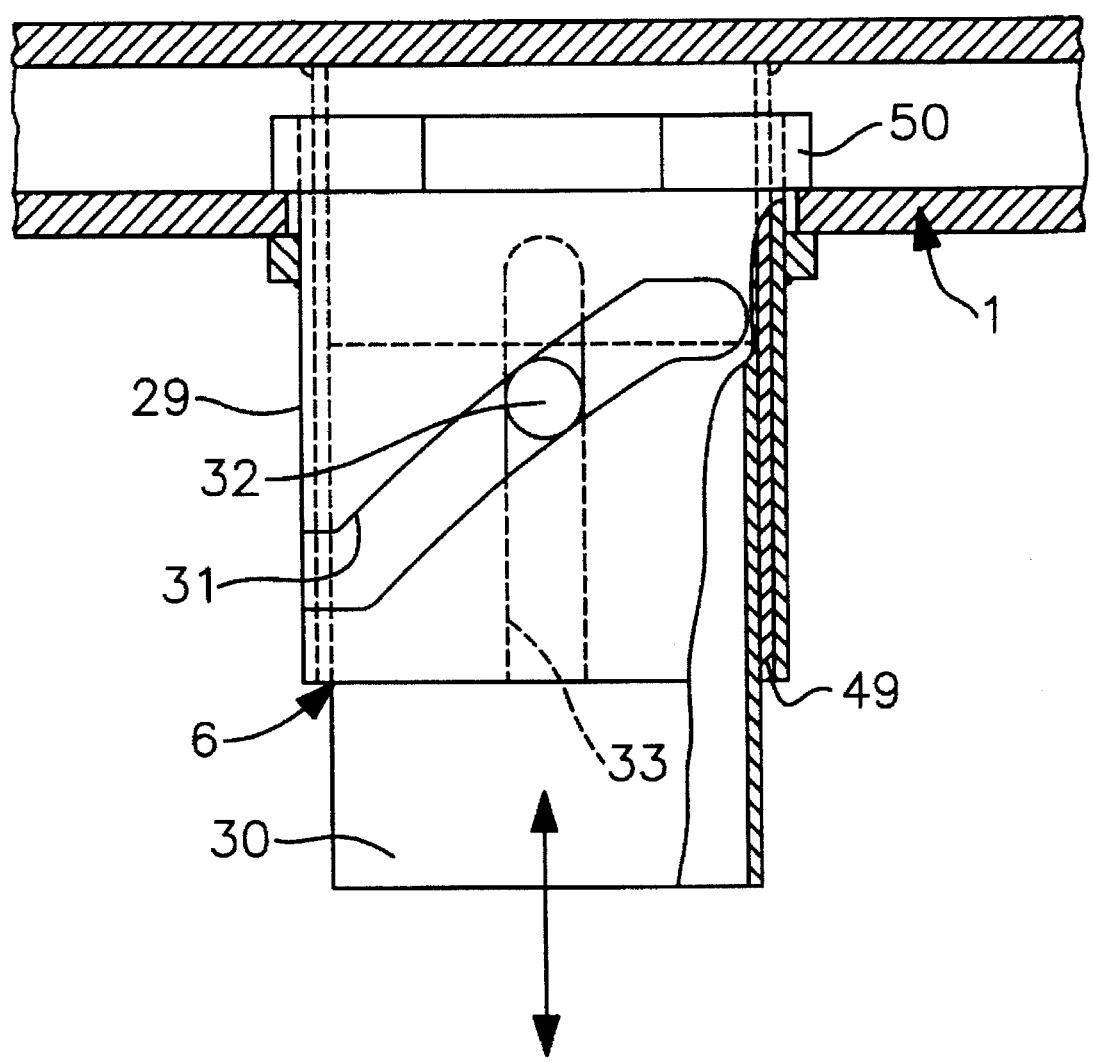
FIG. 6 is a partially sectional side view showing a structure of a resisting member having a fin structure.

FIGS. 1 to 3 show the first embodiment of the present invention described in claim 1. Flat plate-like upper frame 1 and lower frame 2 are horizontally opposed to one another in a vertical direction. Between the upper frame 1 and the lower frame 2, a plurality of coil springs 3 are spaced in a longitudinal direction and in a transverse direction so as to be disposed in parallel. The respective coil springs 3 are disposed in containers 9 which are partitioned by partition panels 4, and are defined by the independent partition panels 4 and lower frame 2. Lower positioning plate bodies 16 are fitted with lower ends of the respective coil springs 3, and are secured by welding to a top surface of the lower frame 2. Damping materials 5 are made of gelled material such as silicone gel, and are accommodated in the lower frame 2 defined by the lower frame 2 and the partition panels 4.

Upper positioning plate bodies 17 are secured by welding to a bottom surface of the upper frame 1 to be fitted with upper ends of the respective coil springs 3. The lower ends and the upper ends of the coil springs 3 are fitted with the lower positioning plate bodies 16 and the upper positioning plate bodies 17. Upper ends of resisting members including hollow metallic bodies are secured by welding to center portions of the respective coil springs 3.

A top surface plate 18 is made of metal or the like, and is secured by welding to a top surface of the upper frame 1. L-shaped supporting metals or brackets 20 are fixed on both right and left sides of the top surface plate 18. A plurality of lower bolts 14 pass through a horizontal plate of the left supporting metal 20, and lower ends of the lower bolts 14 are fixed on both right and left sides of the lower frame 2 with screwing. A washer 21 is mounted on the horizontal plate in the supporting metal 20 to be fitted with the lower bolt 14, and an upper portion of the lower bolt 14 is screwed into a spring compressing nut 15. Note that the respective bolt-receiving openings formed in the respective horizontal parts of brackets 20 have a diameter greater than the diameter of the respective bolts 14, and that each nut 15 is positioned above, i.e., in vertically spaced relation to, its associated opening when the novel apparatus is in use. Washers 21, of course, have a diameter greater than the diameter of their associated bolt-receiving openings. When nuts 15 are in their respective positions as depicted in FIG. 2, each coil spring 3 is in repose. When the novel apparatus is in transport, said nuts 15 are advanced until they abut their associated washers 21, and further advancement places coil spring 3 under compression.

A plurality of bolt through holes 22 are provided in the top surface plate 18, and cap nuts 23 are secured by welding to the upper frame 1 at a lower portion of an outside fin member 29 thereof. Further, a plurality of rubber cushioning materials 24 are secured to a bottom surface of the lower frame 2.

Anchor bolts 25 are embedded into both the right and left sides of the lower frame 2, and the lower frame 2 is fixed on a rigid supporting member 27 by a nut 26 into which the anchor bolt 25 is screwed. The gelled material such as silicone gel may be preferably used as the damping material 5 in the present invention.

FIGS. 4 to 7 show the second embodiment of the present invention. A container 9 having an opening upper portion and a square cross-section is fixed onto a concrete base or another rigidly supporting member 27. A resisting member 6 having a fin structure includes an outside resisting member 29, an inside resisting member 30, and an intermediate cylindrical body 49 which are slidably fitted with each other. An inclined groove 31 is provided in a side surface of the outside resisting member, and a nut 50 is secured by welding or the like to an upper portion of the outside resisting member. The resisting member 6 is supported by an upper frame 1 through the nut 50. An upper end of the intermediate cylindrical body 49 is secured to the upper frame 1, and a pin 32 is fixed at an upper portion of the inside resisting member 30 to be fitted into the inclined groove 31 and into a vertical slit 33 in the intermediate cylindrical body 49. When the nut 50 in the outside resisting member 29 is rotated, the outside resisting member 29 is rotated to move the pin 32 along the inclined groove 31 and the vertical slit 33. Therefore, the inside resisting member 30 can move in a vertical direction to vary a damping performance and a natural oscillation characteristic in a horizontal direction.

Figure 7:
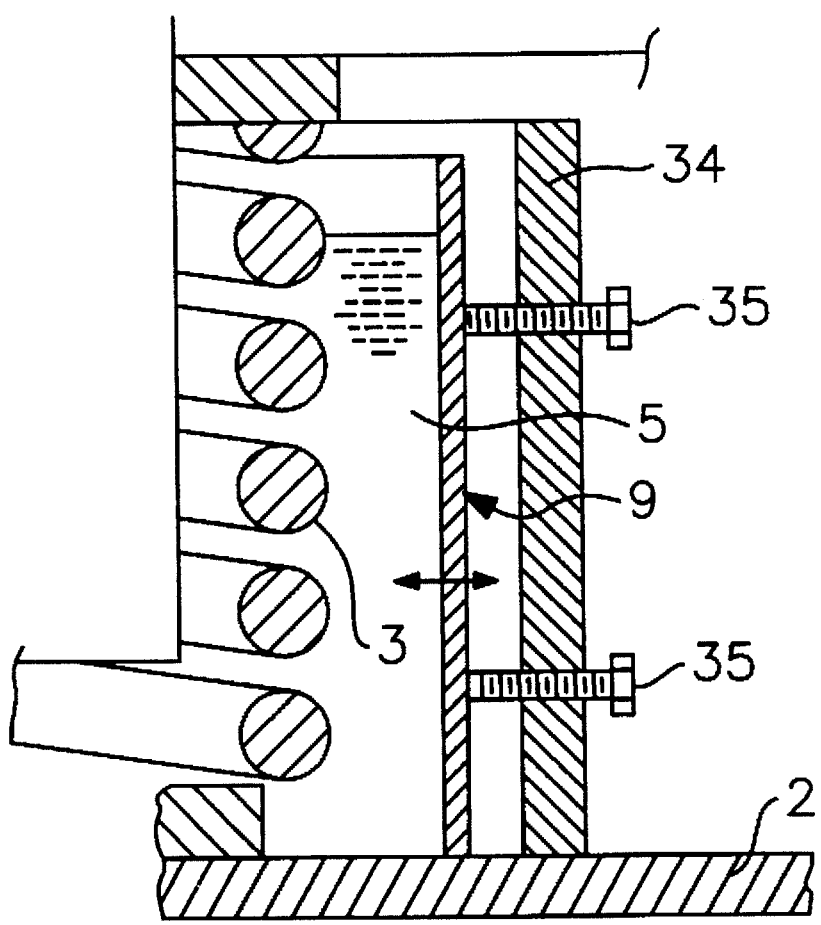
FIG. 7 is a sectional side view showing another third embodiment in which a container is transversely movable.
Figure 8:
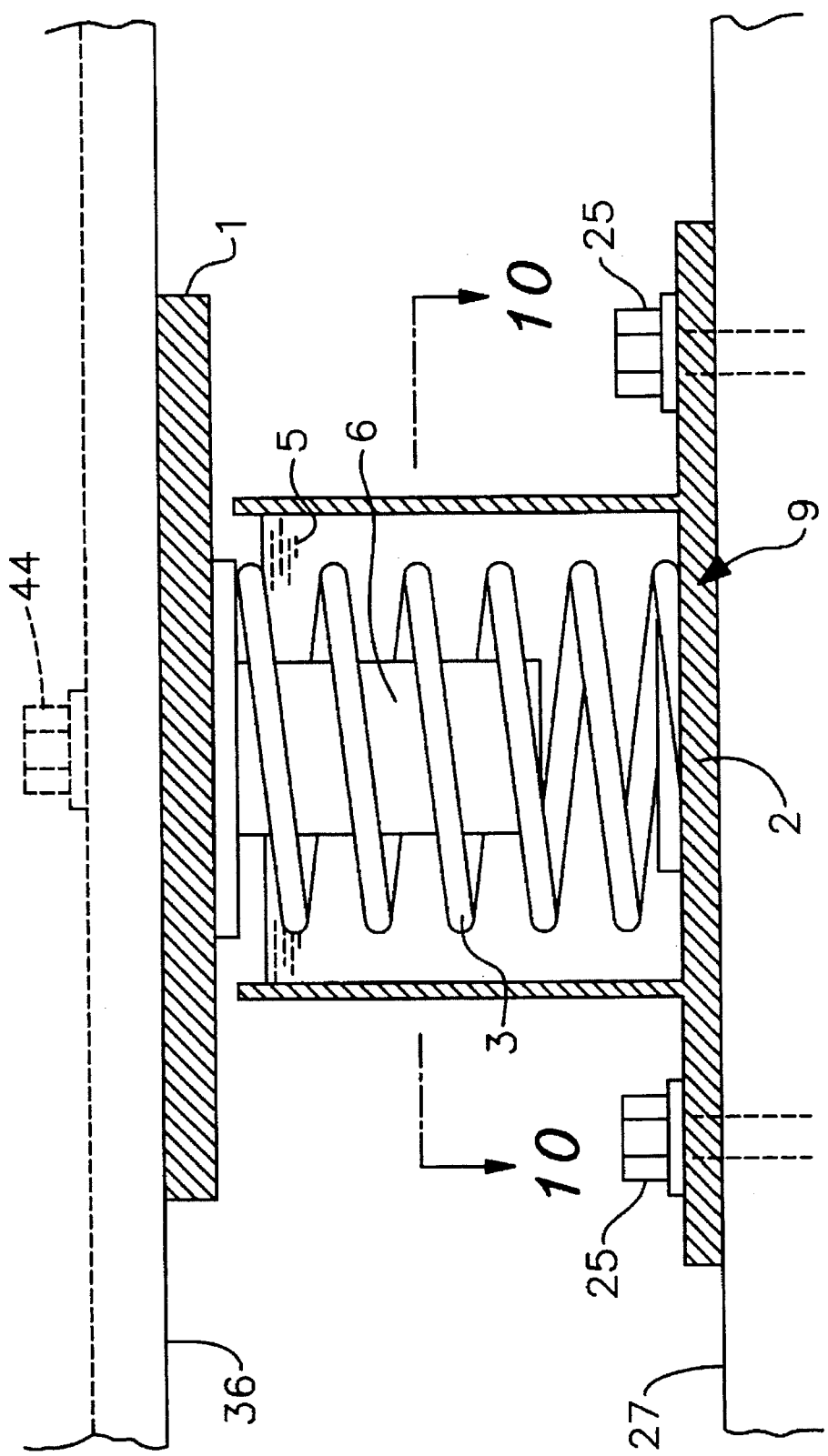
FIG. 8 is a partially sectional side view showing a vibration isolating supporter according to the third embodiment of the present invention, which can isolate vibration in six directions.
Figure 9:
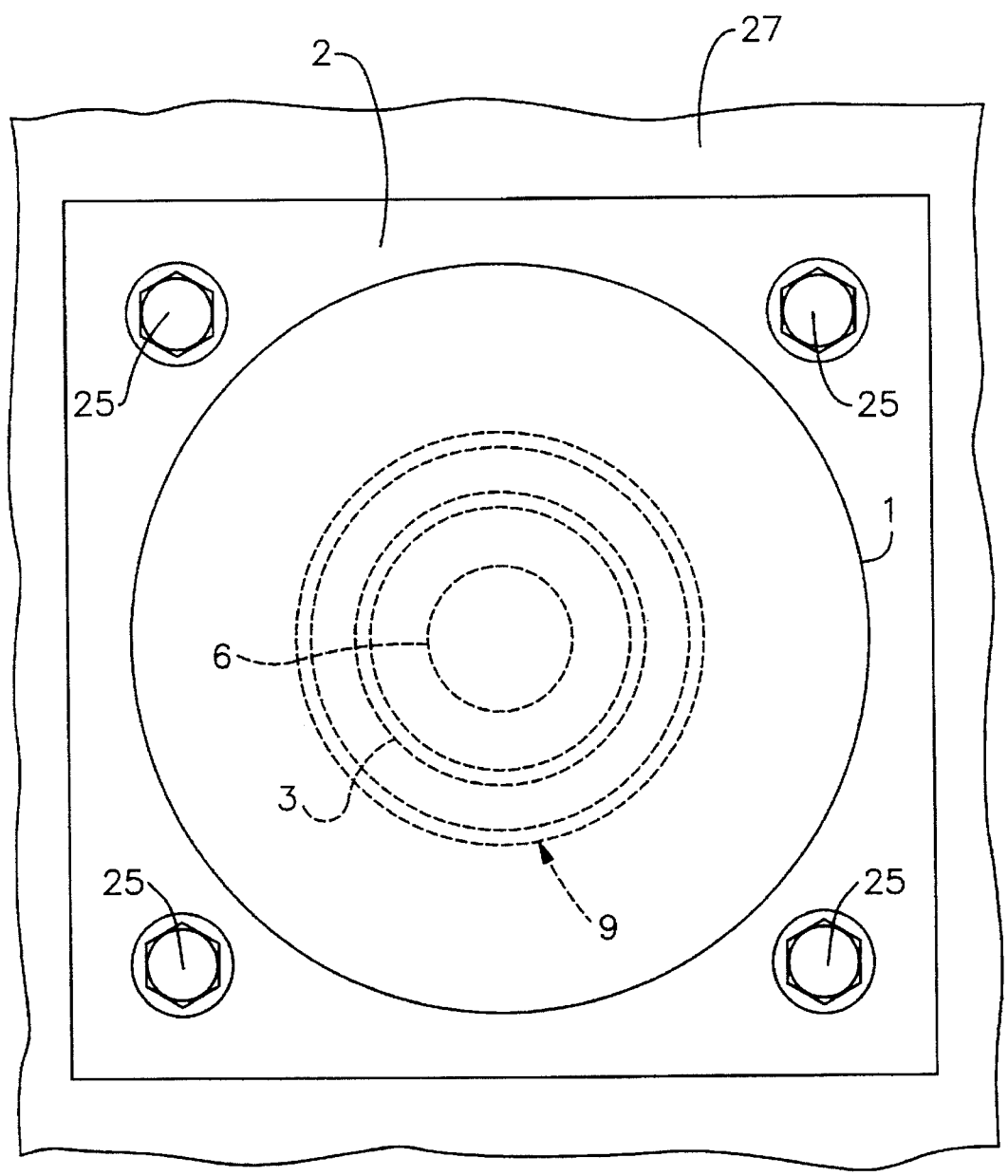
FIG. 9 is a plan view showing a vibration isolating supporter according to the fourth embodiment of the present invention, which can isolate vibration in six directions.
Figure 10:
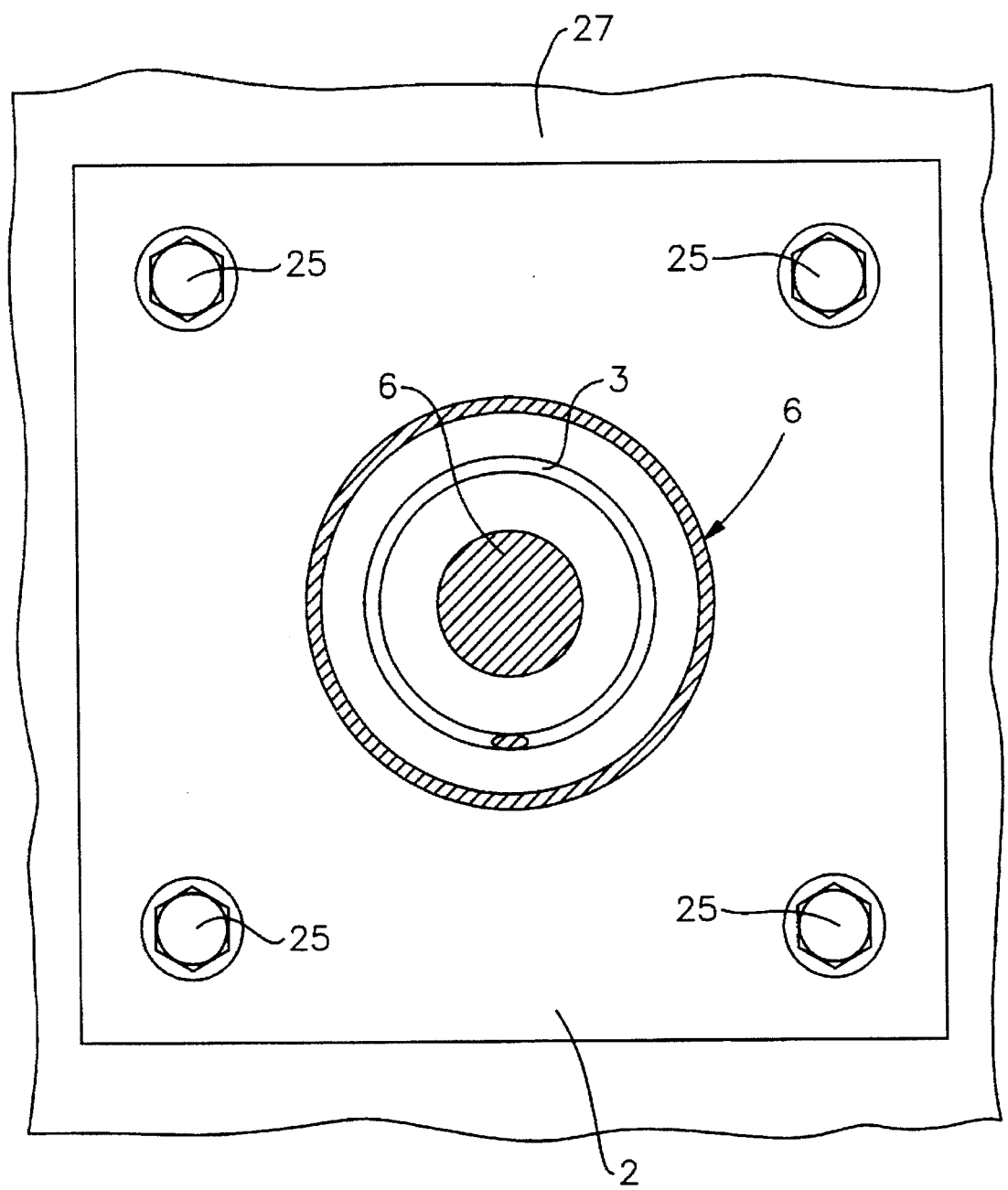
FIG. 10 is a sectional view taken along line 10—10 of FIG. 8.
Figure 11:
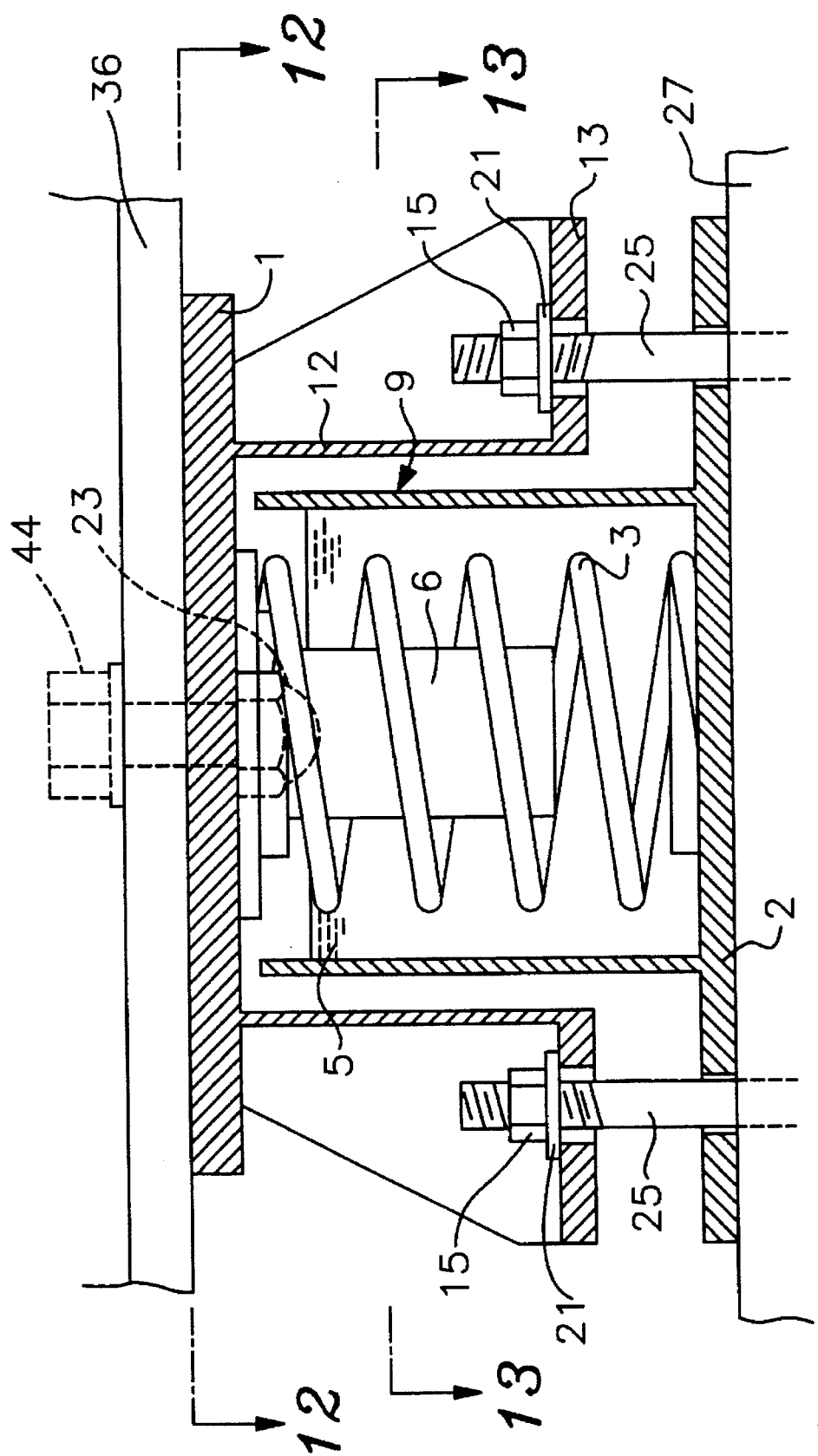
FIG. 11 is a sectional side view showing a vibration isolating supporter according to the eighth embodiment of the present invention, which can isolate vibration in six directions.
Figure 12:
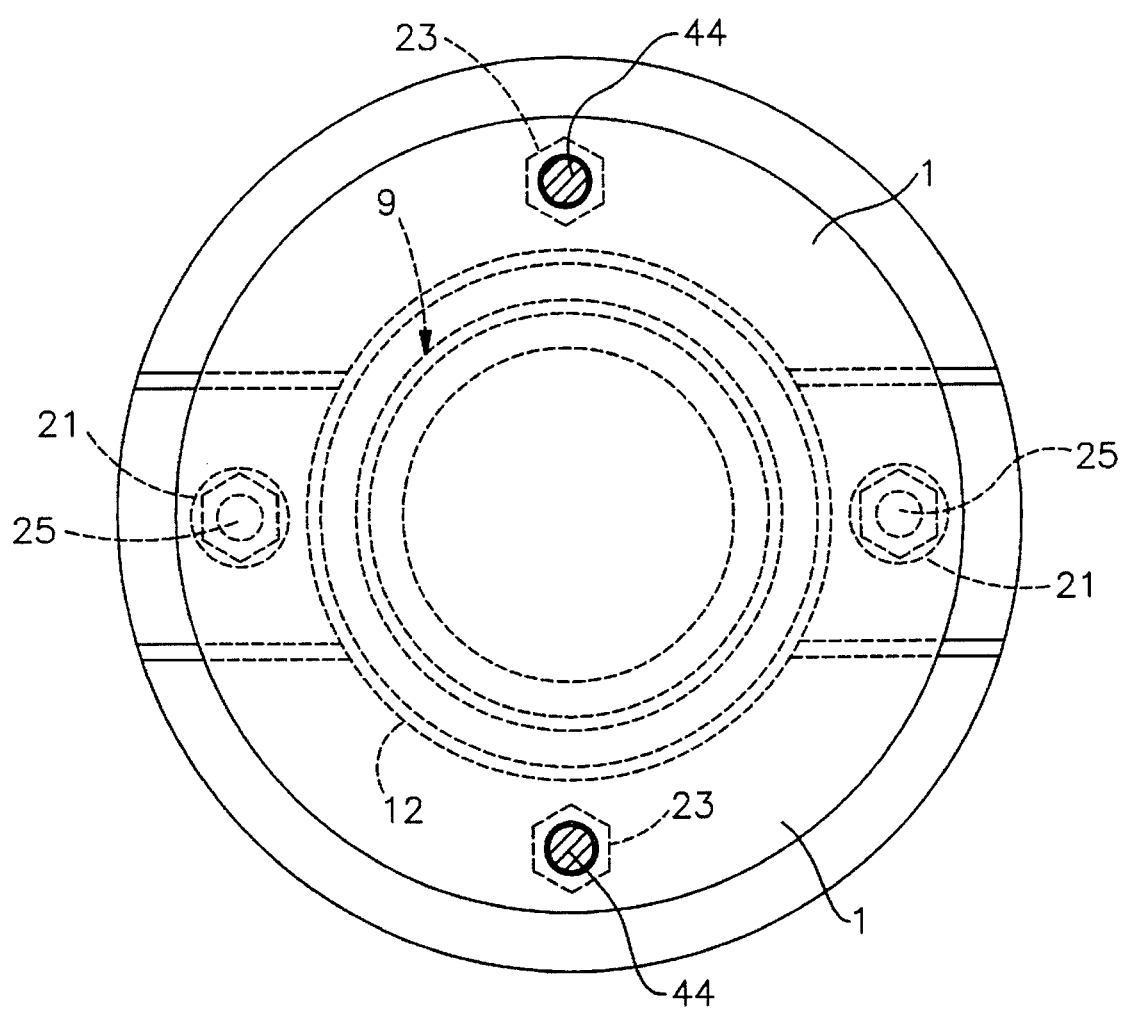
FIG. 12 is a sectional view taken along line 12—12 of FIG. 11.
Figure 13:
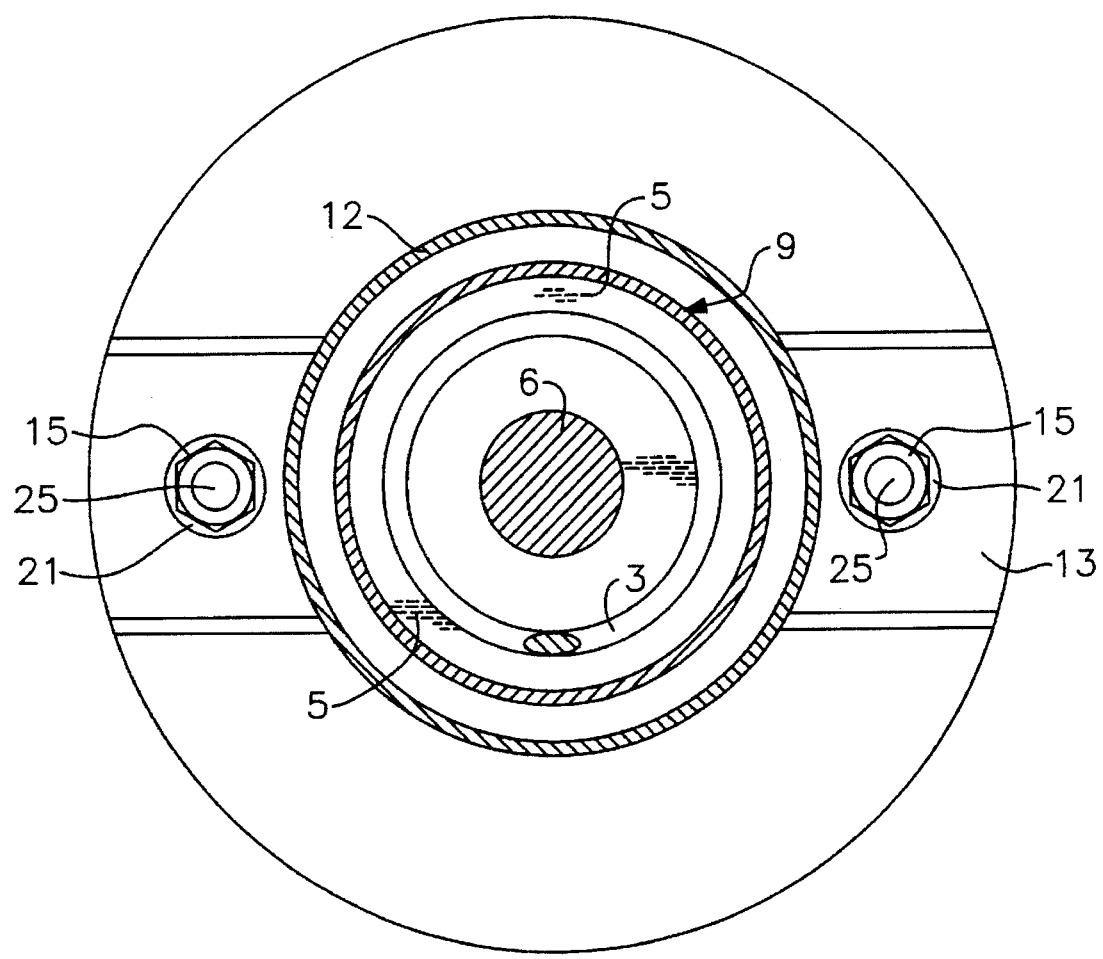
FIG. 13 is a sectional view taken along line 13—13 of FIG. 11.
Figure 14:
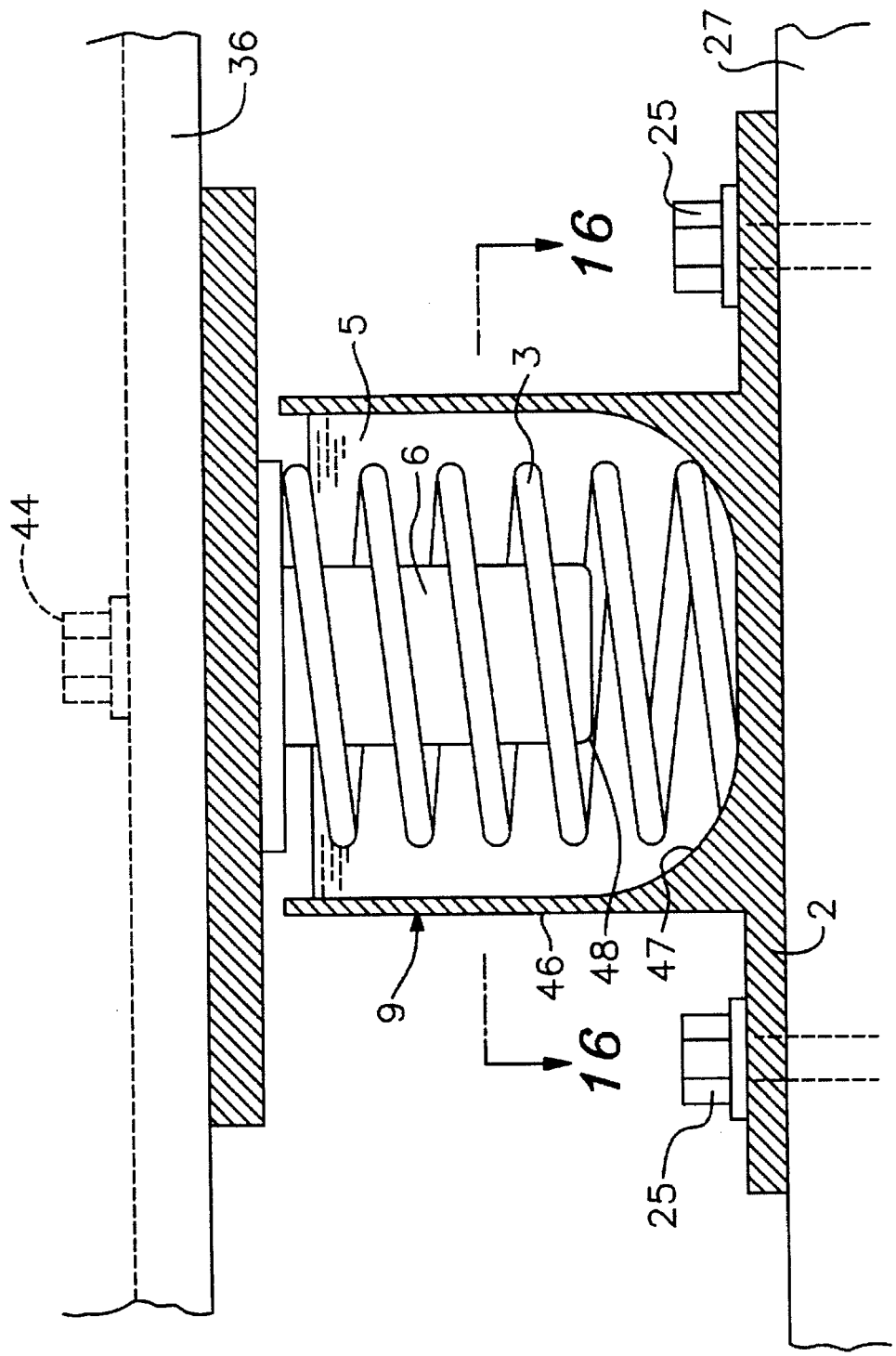
FIG. 14 is a partially sectional side view showing a vibration isolating supporter according to another fifth embodiment of the present invention, which can isolate vibration in six directions.
Figure 15:
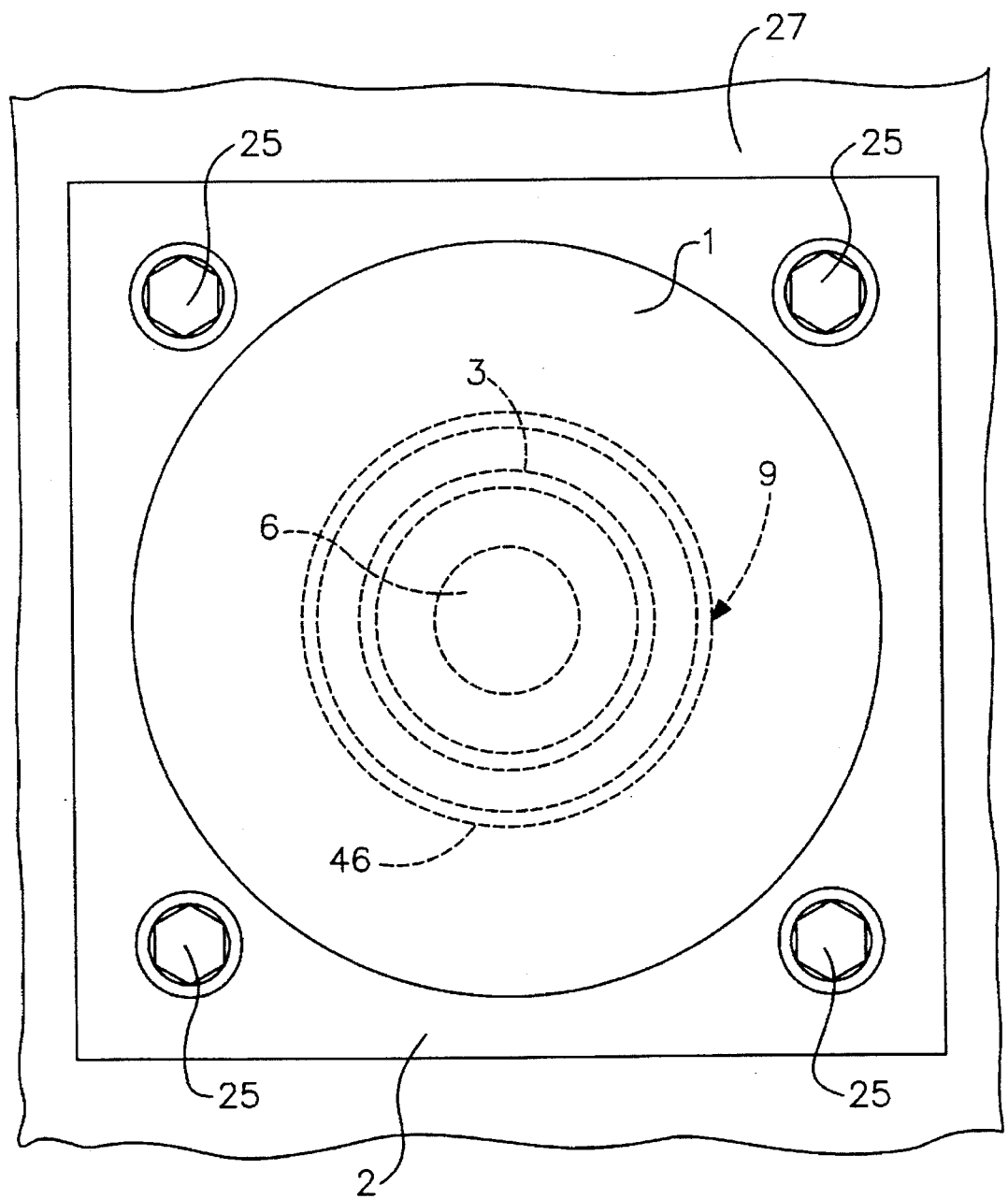
FIG. 15 is a plan view of a part shown in FIG. 14.
Figure 16:
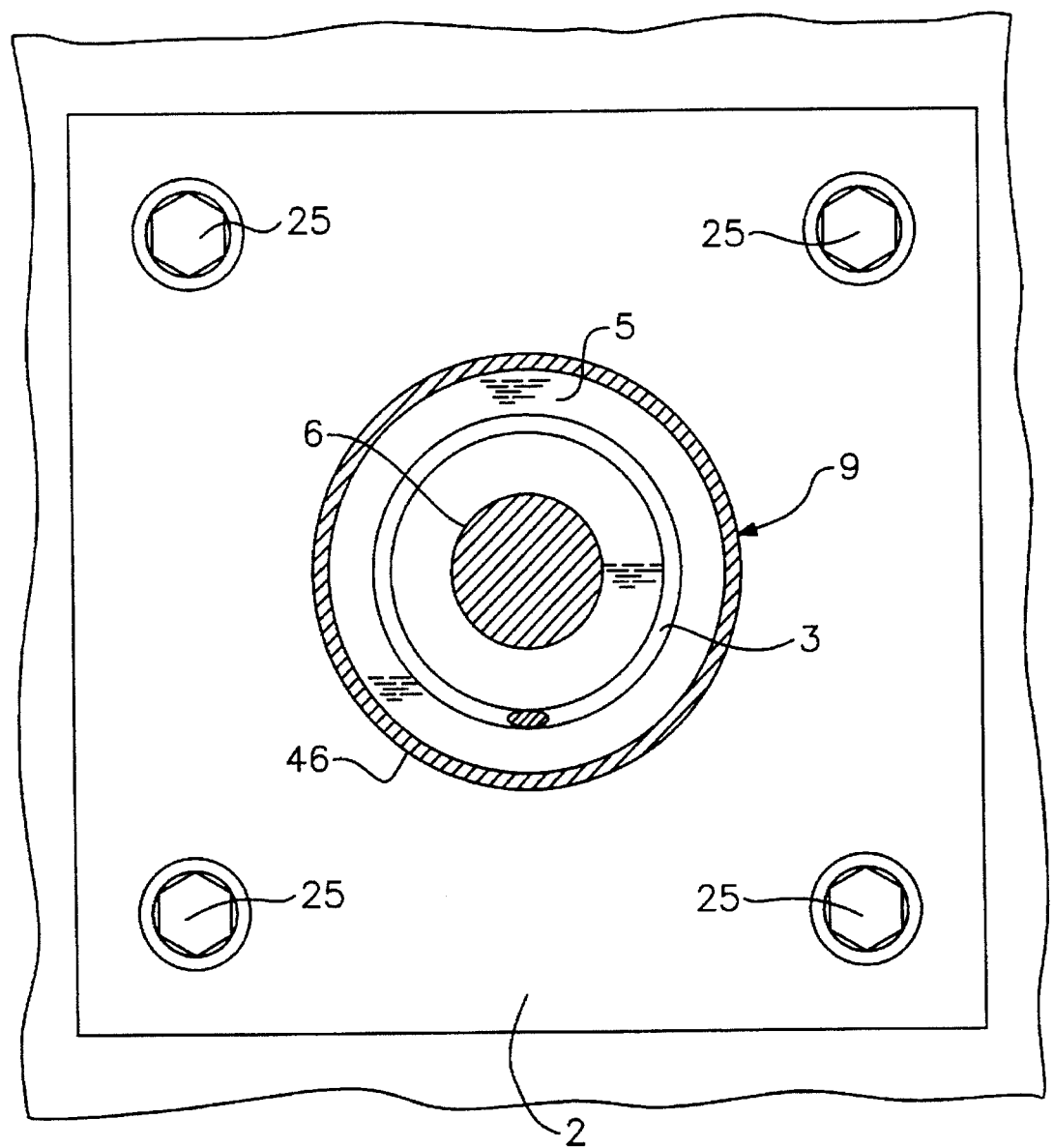
FIG. 16 is a sectional view taken along line 16—16 of FIG. 14.

Further, in case of FIG. 7, many bolts 35 are screwed into a periphery of a cylindrical casing 34 fixed to a lower frame 2 so as to contact distal ends of the bolts 35 with the container 9 accommodating a damping material 5. The container 9 can be transversely moved in a desired direction by rotating the respective bolts 35.

The following descriptions respectively show each damping ratio (C/Cc, where C being viscous damping coefficient, and Cc being critical damping coefficient) under the following conditions a to d in the comparative embodiments 1 and 2 and in the first embodiment of the present invention. Conditions:

a. Vertical spring constant of one coil spring Kv1=233 kg/cm

Vertical spring constant of four coil springs Kv4=
Kv1×4 springs/set=932 kg/cm b. Movable load per set; 3350 kg f c. Used damping material; Silicone gel having penetration of 75 d. Input vibration; Continuously slight vibration

Comparative Embodiment 1

Figure 23:
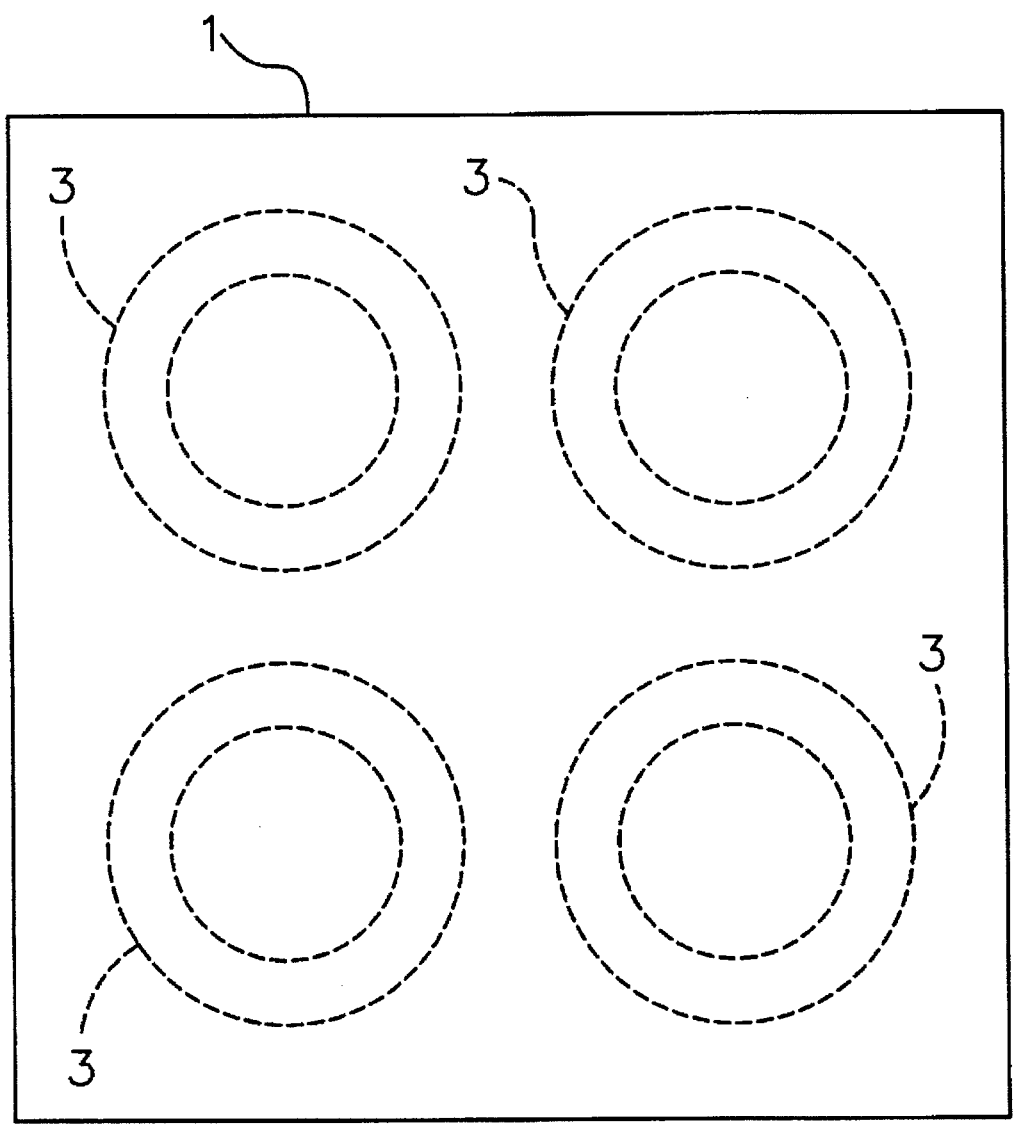
FIG. 23 is a plan view showing a vibration isolating supporter in the comparative embodiment 1.
Figure 24:
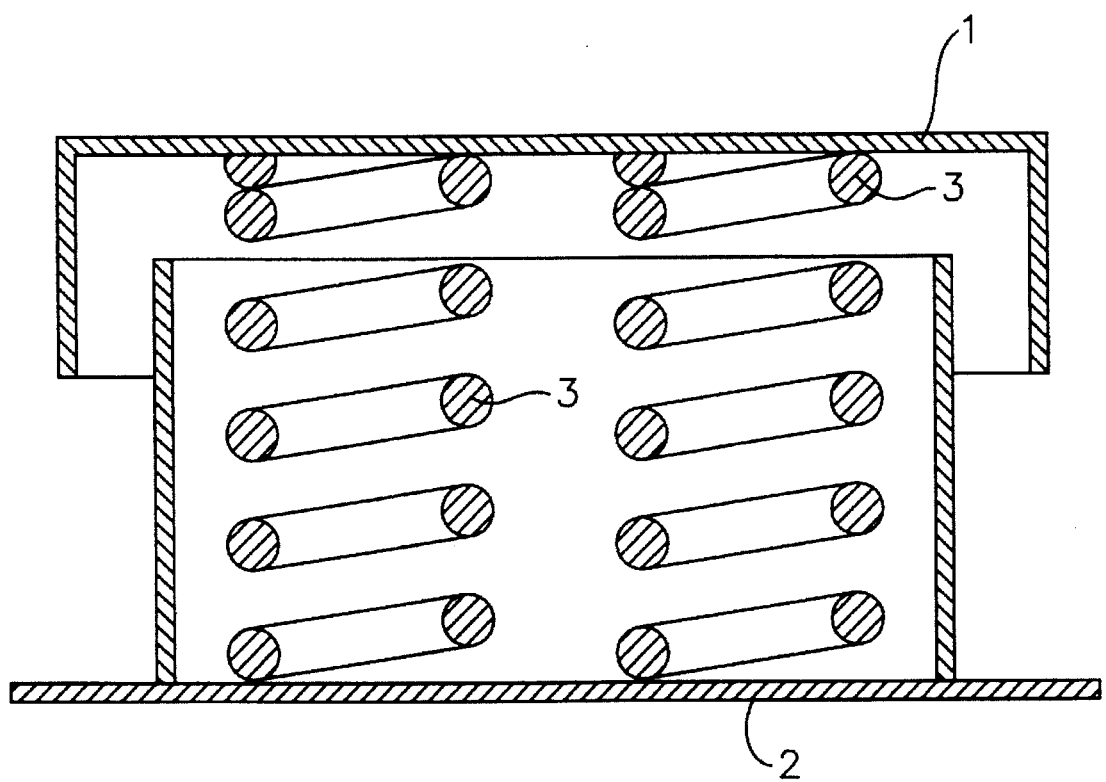
FIG. 24 is a sectional side view of the vibration isolating supporter shown in FIG. 23.

As shown in FIGS. 23 and 24, there was provided a vibration isolating supporter in which the four coil springs 3 were interposed together between the upper frame 1 and the lower frame 2.

When a vibration level of the vibration isolating supporter was measured, a natural frequency was 48.52 Hz (Hertz), and a damping ratio was 0.002.

Comparative Embodiment 2

Figure 25:
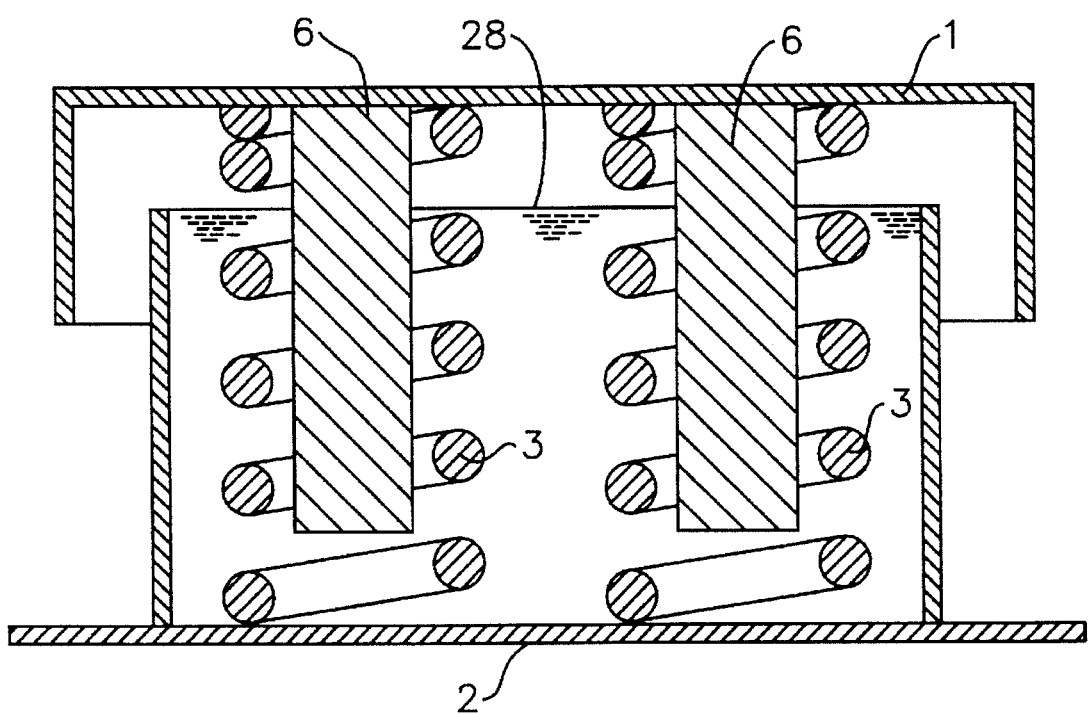
FIG. 25 is a sectional side view of a vibration isolating supporter in the comparative embodiment 2.

As shown in FIG. 25, there was provided a vibration isolating supporter in which the four coil springs 3 and the resisting members were interposed together between the upper frame 1 and the lower frame 2, and all the coil springs 3 were concurrently immersed in silicone gel 28.

When a vibration level of the vibration isolating supporter was measured, a natural frequency was 18.66 Hz, and a damping ratio was 0.059. Further, when a vibration level of the vibration isolating supporter shown in FIGS. 1 to 3 was measured, a natural frequency was 4.0 Hz, and a damping ratio was 0.196.

As is apparent from the result, in the vibration isolating supporter of the present invention, the damping material 5 is accommodated in the partition panels 4 partitioning for each coil spring 3, and the resisting members are disposed to be immersed in the damping material 5. Therefore, it is possible to provide a considerably higher damping effect.

FIGS. 8 to 16 show one embodiment of the present invention. A lower frame 2 of a container 9 having an open upper portion and a circular cross-section is fixed to an upper portion of a concrete base or another rigidly supporting member 27 by bolts or anchor bolts 25. A vibration body 36 disposed above the container 9 is fixed to an upper portion of an upper frame 1 by a bolt 44. A lower end of a coil spring 3 concentrically disposed in the container 9 is secured to the container 9 by welding or the like. Further, an upper end of the coil spring 3 is mounted on a bottom surface of the upper frame 1 to be secured by welding or the like, and an upper end of a resisting member concentrically disposed in the coil spring 3 is fixed to the above-mentioned intermediate portion. A damping material 5 made of silicone gel is accommodated in the container 9.

Figure 17:
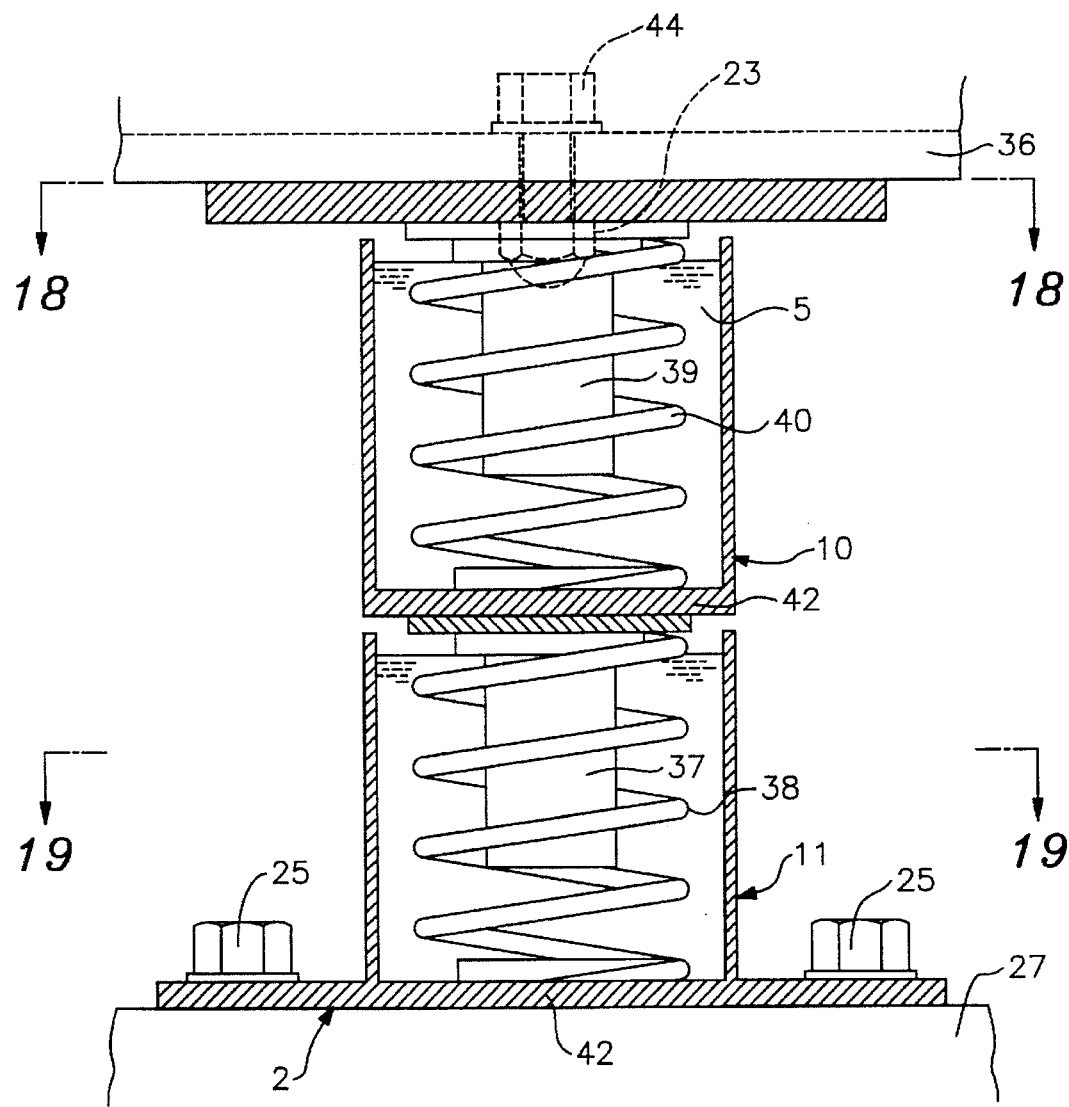
FIG. 17 is a sectional side view showing an upper and lower composite type of vibration isolating supporter.
Figure 18:
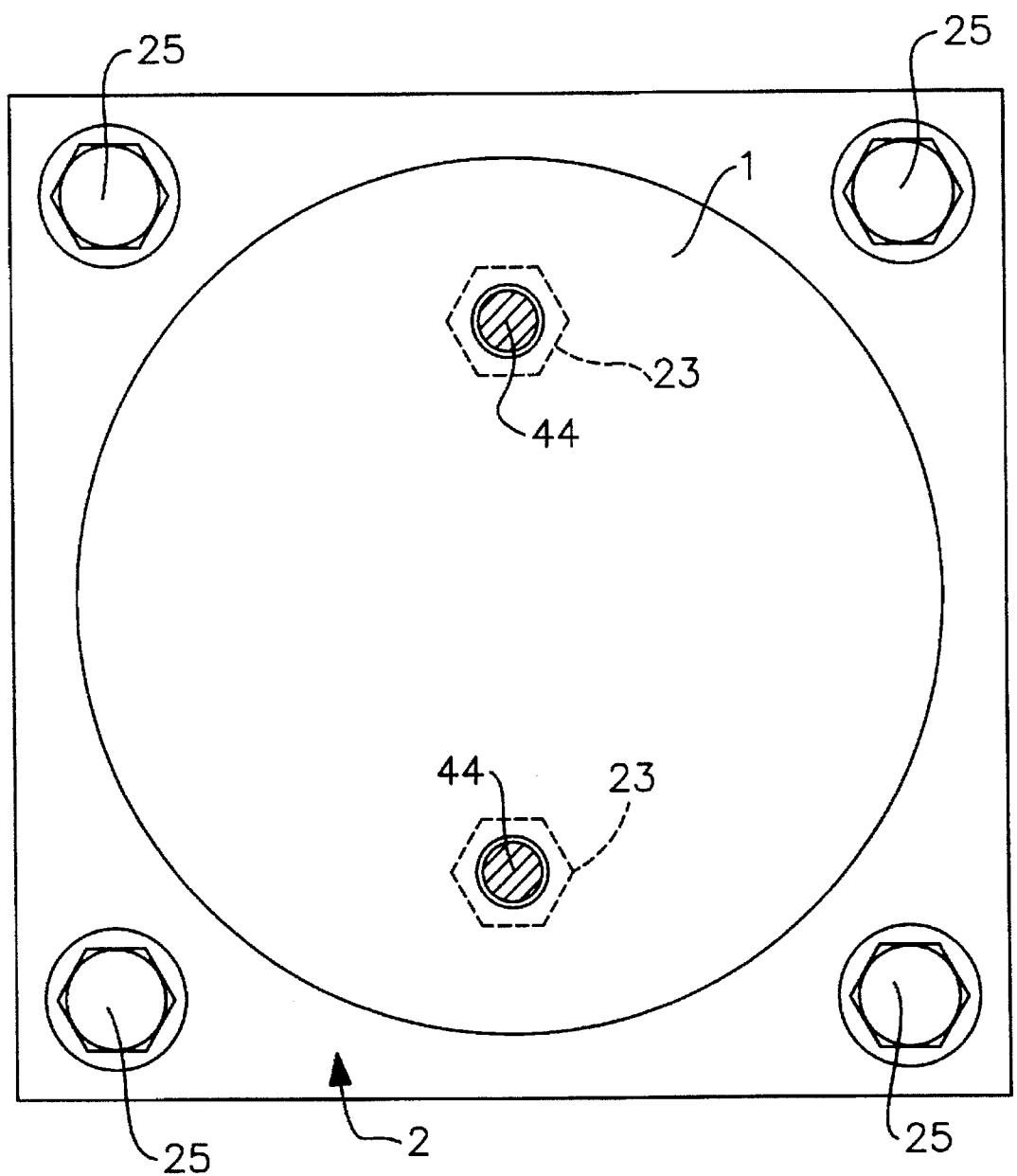
FIG. 18 is a sectional view taken along line 18—18 of FIG. 17.
Figure 19:
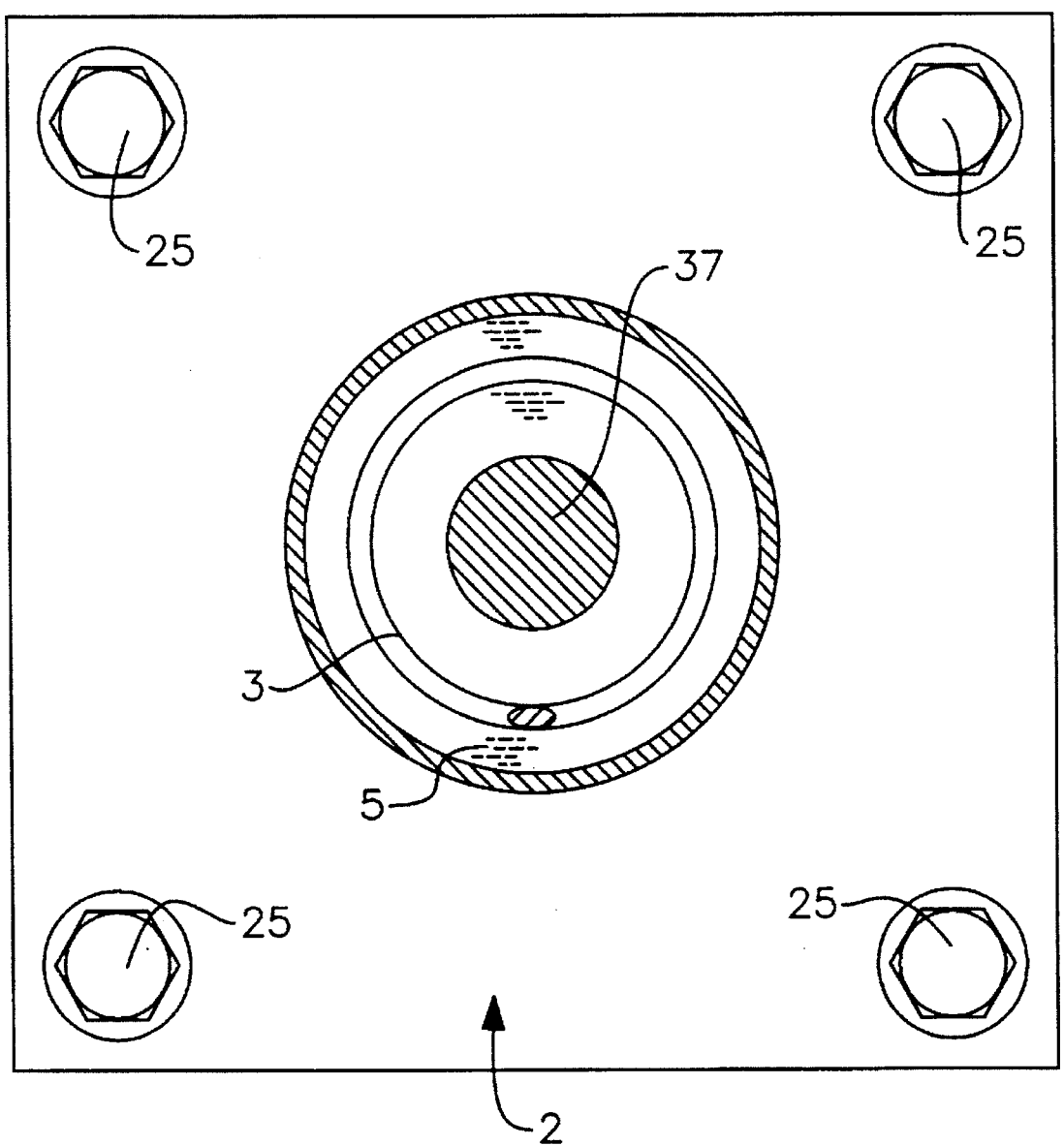
FIG. 19 is a sectional view taken along line 19—19 of FIG. 17.

FIGS. 17 to 19 show the sixth embodiment of the present invention. An outside portion of a bottom plate in a lower container 11 having an opening upper portion and a circular cross-section is fixed to an upper portion of a concrete base or another rigidly supporting member 27 by a plurality of anchor bolts 25. An upper container 10 having an opening upper portion and a circular cross-section is disposed above the lower container 11. An upper end of the rigidly supporting member 27 having the circular cross-section is fixed to an intermediate lower portion of the bottom plate in the upper container 10. In the lower container 11, both upper and lower ends of a lower coil spring 38 surrounding a lower resisting member 37 are fixed to the bottom plate of the upper container 10 and the bottom plate of the lower container 11. An upper end of an upper resisting member 39 having a circular cross-section is fixed to an intermediate lower portion of an upper frame 1 disposed above the upper container 10. In the upper container 10, the upper resisting member 39 is fixed to the bottom plate of the upper container 10. The damping materials 5 are accommodated in the lower container 11 and the upper container 10, and the damping material 5 is accommodated in the container 9 defined by the lower frame 2 and the partition panels 4. Both upper and lower ends of an upper coil spring 40 are fixed to the upper frame 1 and the bottom plate 42 of the upper container 10. A cap nut 23 is secured by welding at a position conforming to a bolt through hole 22 provided in the upper frame 1. A vibrating vibration body 36 is fixed to the upper frame 1 by a bolt 35 screwed into the cap nut 23.

Figure 20:
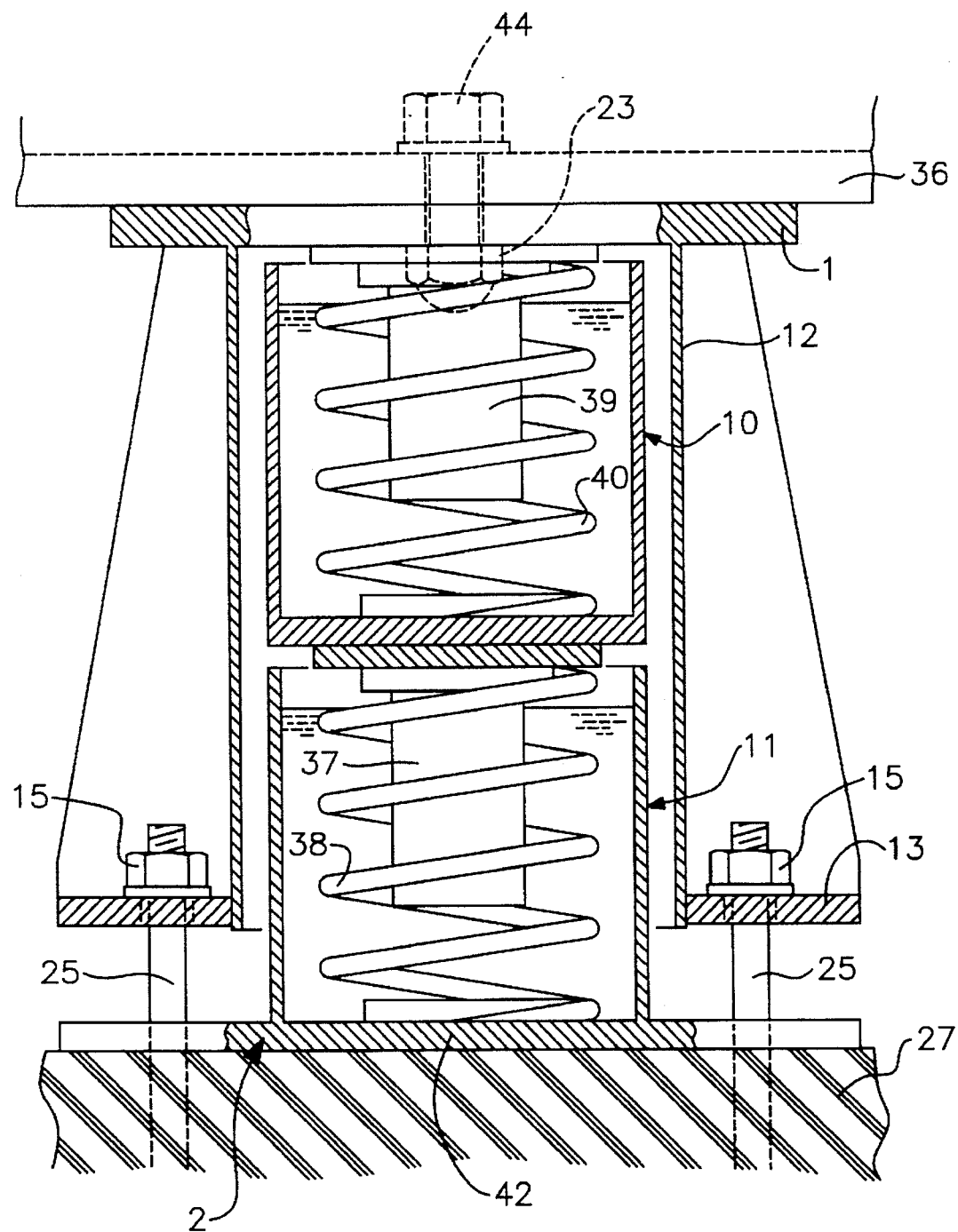
FIG. 20 is a sectional side view showing another upper and lower composite type of vibration isolating supporter.
Figure 21:
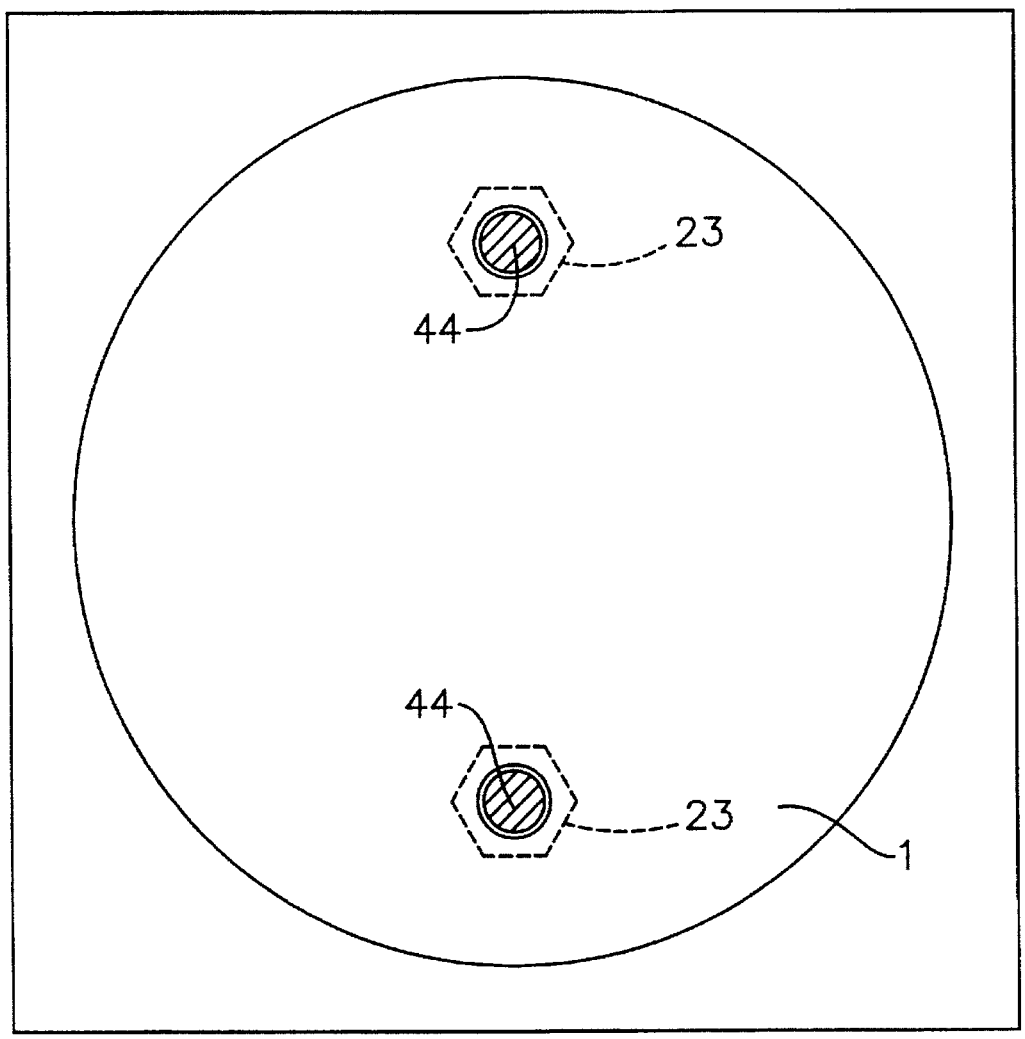
FIG. 21 is a plan view of the vibration isolating supporter shown in FIG. 20.
Figure 22:
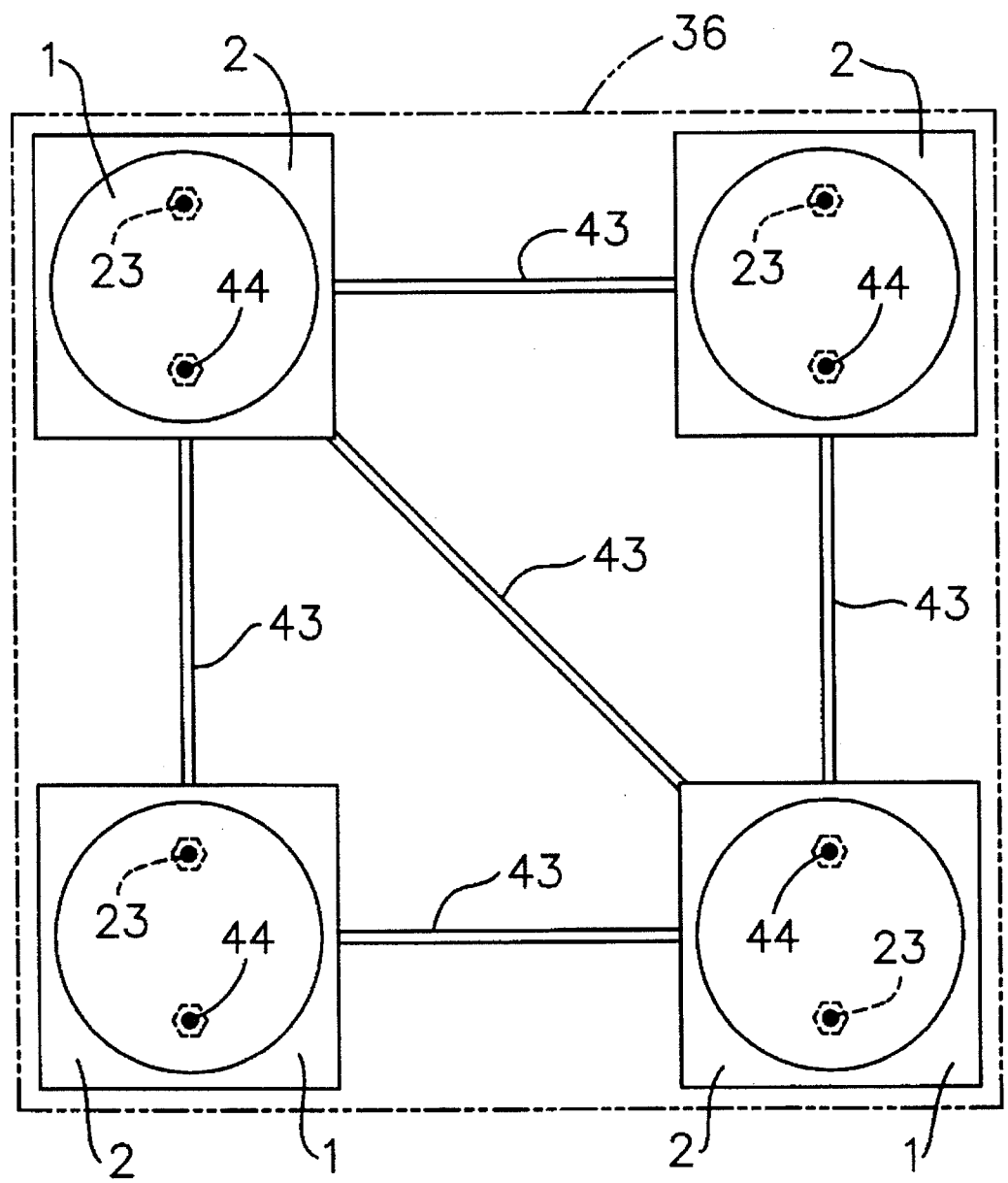
FIG. 22 is a plan view showing a state in which four upper and lower sets of vibration isolating supporters are connected.

FIGS. 20 to 22 show the seventh embodiment of the present invention. A vertical cylindrical body 12 covers an upper container 10 and an upper side portion of a lower container 11, and an upper end of the vertical cylindrical body 12 is secured to an upper frame 1. A plurality of bolt through holes are provided in annular washer plates 13 fixed to lower portions of the cylindrical body 12. A plurality of anchor bolts 25 are fixed to a concrete rigidly supporting member 27. The anchor bolt 25 passes through a bottom plate and the annular washer plate 13, and the anchor bolt 25 is screwed into a spring compressing nut 15 on the annular washer plate 13.

FIG. 22 shows an illustrative arrangement of the lower container 11 and the upper container 10. Four sets of the lower containers 11 and the upper containers 10 are disposed to form a square, and the respective lower containers 11 and the respective upper containers 10 are connected through pipe bodies 43 and so forth.

In case of a vibration isolating supporter of the present invention which can isolate vibration in six directions, the plurality of vibration isolating supporters are vertically layered and disposed so as to effectively isolate the vibration in the six directions.

The vibration isolating supporters of the present invention are disposed and used at a plurality of positions with appropriate intervals under, for example, a floor member of a building. Thus, the vibration can be damped by the damping materials 5 which are provided around a plurality of coil springs 3. In the present invention, it is possible to withstand large load, instead of using a large scale coil spring 3, by using the plurality of coil springs 3. Further, partition panels 4 respectively covering the plurality of coil springs 3 can restrict movement of the damping material 5 to significantly improve a damping effect, resulting in an efficient vibration isolating action.

EFFECT OF THE INVENTION

According to the present invention, a vibration isolating supporter includes a coil spring 3 interposed between an upper frame 1 and a lower frame 2 which are opposed to one another in a vertical direction. In the vibration isolating supporter, a partition panel 4 is provided for the lower frame 2 to surround a periphery of the coil spring 3, a damping material 5 is accommodated in a portion surrounded by the partition panel 4, and a resisting member is disposed to be suspended in a hollow hole of the coil spring 3 of the upper frame 1 so as to be immersed in the damping material 5. As a result, it is possible to effectively and rapidly damp vibration of a vibrating object, and it is possible in one vibration isolating supporter to withstand large load of, for example, an entire floor member of a factory building by using a plurality of coil springs 3 together, instead of using a large scale coil spring 3. Further, it is possible to significantly improve a vibration damping effect and efficiently perform a vibration isolating action by providing the partition panels 4 respectively covering the plurality of coil springs 3.

Further, a resisting member having a fin structure is expansibly provided so as to increase and decrease an immersing area with respect to the damping material 5. It is thereby possible to adjust a damping performance and a natural oscillation characteristic in a horizontal direction. Further, the partition panel 4 is movably provided to increase and decrease a constrictive width in a horizontal direction with respect to the damping material 5. It is thereby possible to adjust a damping performance and a natural oscillation characteristic in a vertical direction. As a result, when the damping performance and the natural oscillation characteristic of the vibration isolating supporter are changed by variation of equipment load, it is possible to easily adjust the damping performance and the natural oscillation characteristic to original design conditions while the vibration isolating supporter is not exchanged to be left installed.

Further, a plurality of stacks of containers accommodating the coil spring 3 and the damping material 5 are disposed in a vertical direction, resulting in effectively damping vibration.

INDUSTRIAL APPLICABILITY

The present invention relates to a vibration isolating supporter to isolate vibration input into a structure such as building, road beam, or railway beam, an operator's cab, a marine structure or the like. Alternatively, the present invention relates to a vibration isolating supporter to make it hard to externally transfer vibration from, for example, a motor, a manufacturing equipment, a machine for heavy engineering industry or an engine. Alternatively, the present invention relates to a vibration isolating supporter for removing vibration to reduce vibration input from a base, a frame or the like. More particularly, the present invention relates to a vibration isolating supporter which can concurrently isolate vibration in both vertical and horizontal directions, and isolate vibration in a rotation direction.

The present invention relates to a vibration isolating supporter applied to the following arts:

(1) Art used to improve a working environment with respect to vibration generated at a factory or the like, and used to concurrently isolate vibration in both the vertical and horizontal directions;

(2) Art used for a vibration isolating apparatus to make it hard to externally transfer vibration from a rotating machine, and used to concurrently isolate vibration in both the vertical and horizontal directions; and (3) Art used for a vibration removing apparatus to reduce vibration input from the base or the like, and used to concurrently isolate vibration in both the vertical and horizontal directions.

We claim:

1. A vibration isolating structure, comprising:

an upper frame and a lower frame disposed in vertically spaced apart relation to one another;

said upper frame including a top surface plate and a bottom surface plate disposed in vertically spaced relation to one another;

at least one coil spring disposed between said upper and lower frames;

at least one upstanding partition means mounted on said lower frame in surrounding relation to said at least one coil spring, said at least one partition means having a predetermined length;

a damping material contained within said at least one upstanding partition means so that said at least one coil spring is at least partially submerged in said damping material;

a resisting member ensleeved by said at least one coil spring;

said resisting member being at least partially immersed within said damping material;

said resisting member including an outside resisting member, an inside resisting member, and an intermediate cylindrical member disposed therebetween, said outside and inside resisting members being slideably mounted with respect to said intermediate cylindrical member;

a nut rotatably secured to a top surface of said bottom surface plate of said upper frame;

said outside resisting member having an uppermost end secured to said nut;

said intermediate cylindrical member having an uppermost end secured to said top surface plate of said upper frame;

a vertically extending slot formed in said intermediate cylindrical member;

a radially outwardly extending pin secured to said inside resisting member;

an elongate, inclined groove formed in said outside resisting member;

said pin being slideable within said inclined groove;

whereby rotation of said nut effects vertical adjustment of said inside resisting member with respect to said outside resisting member.

2. The vibration isolating structure of claim 1, wherein said at least one upstanding partition means includes a plurality of individual wall members that collectively surround said at least one coil spring, and wherein said plurality of wall members are movably mounted with respect to said lower frame to enable adjustment of said predetermined length.

* * * * *